United States Patent
Pau et al.

(10) Patent No.: US 11,140,446 B2
(45) Date of Patent: Oct. 5, 2021

(54) SENSITIVITY ASSESSMENT FOR MEDIA PRODUCTION USING ARTIFICIAL INTELLIGENCE

(71) Applicant: WARNER BROS. ENTERTAINMENT INC., Burbank, CA (US)

(72) Inventors: Hitesh Pau, South Pasadena, CA (US); Geoffrey P. Murillo, Valencia, CA (US); Rajiv R. Lund, Los Angeles, CA (US); Anshul Kumar, Los Angeles, CA (US); Tasha T. Mehta, Los Angeles, CA (US); Alejandro Bringas, Santa Clarita, CA (US); Tarundeep Kaur, Mission Hills, CA (US); Ty Y. Tanita, Los Angeles, CA (US)

(73) Assignee: WARNER BROS. ENTERTAINMENT INC., Burbank, CA (US)

(*) Notice: Subject to any disclaimer, the term of this patent is extended or adjusted under 35 U.S.C. 154(b) by 46 days.

(21) Appl. No.: 16/536,229

(22) Filed: Aug. 8, 2019

(65) Prior Publication Data
US 2020/0366959 A1    Nov. 19, 2020

Related U.S. Application Data

(60) Provisional application No. 62/848,060, filed on May 15, 2019.

(51) Int. Cl.
*H04N 21/4545* (2011.01)
*G06N 20/00* (2019.01)
(Continued)

(52) U.S. Cl.
CPC ....... *H04N 21/45455* (2013.01); *G06N 20/00* (2019.01); *H04N 21/4318* (2013.01); *H04N 21/45452* (2013.01); *H04N 21/466* (2013.01)

(58) Field of Classification Search
CPC ....... H04N 21/45455; H04N 21/45452; H04N 21/4318; H04N 21/466; H04N 21/4666;
(Continued)

(56) References Cited

U.S. PATENT DOCUMENTS 10,088,983 B1 * 10/2018 Qaddoura ........ H04N 21/23439
10,671,854 B1 * 6/2020 Mahyar ................ H04N 21/233
(Continued)

OTHER PUBLICATIONS

FFmpeg, "FFmpeg" retrieved online from https://ffmpeg.org/ Nov. 19, 2020.
(Continued)

*Primary Examiner* — Benjamin R Bruckart
*Assistant Examiner* — Akshay Doshi
(74) *Attorney, Agent, or Firm* — One LLP

(57) ABSTRACT

An automatic flagging of sensitive portions of a digital dataset for media production includes receiving the digital dataset comprising at least one of audio data, video data, or audio-video data for producing at least one media program. A processor identifies sensitive portions of the digital dataset likely to be in one or more defined content classifications, based at least in part on comparing unclassified portions of the digital dataset with classified portions of the prior media production using an algorithm, and generates a plurality of sensitivity tags each signifying a sensitivity assessment for a corresponding one of the sensitive portions. The processor may save the plurality of sensitivity tags each correlated to its corresponding one of the sensitive portions in a computer memory for use by a media production or localization team.

17 Claims, 17 Drawing Sheets

(51) Int. Cl.
*H04N 21/431* (2011.01)
*H04N 21/466* (2011.01)

(58) Field of Classification Search
CPC ......... H04N 21/23418; H04N 21/8456; G06N 20/00; G11B 27/28
See application file for complete search history.

(56) References Cited

U.S. PATENT DOCUMENTS

| | | | | |
|---|---|---|---|---|
| 2009/0157747 | A1* | 6/2009 | McLean | G06F 16/435 |
| 2009/0328093 | A1* | 12/2009 | Cansler | H04N 7/17354 |
| | | | | 725/28 |
| 2012/0311625 | A1* | 12/2012 | Nandi | H04N 21/45457 |
| | | | | 725/28 |
| 2019/0230387 | A1* | 7/2019 | Gersten | H04N 21/854 |

OTHER PUBLICATIONS

Mori, S. et al., Springer Open—Open Access, "A survey of diminished reality: Techniques for visually concealing, eliminating, and seeing through real objects", IPSJ Transactions on Computer Vision and Applications, pp. 2-14, published Jun. 28, 2017, Japan.

* cited by examiner

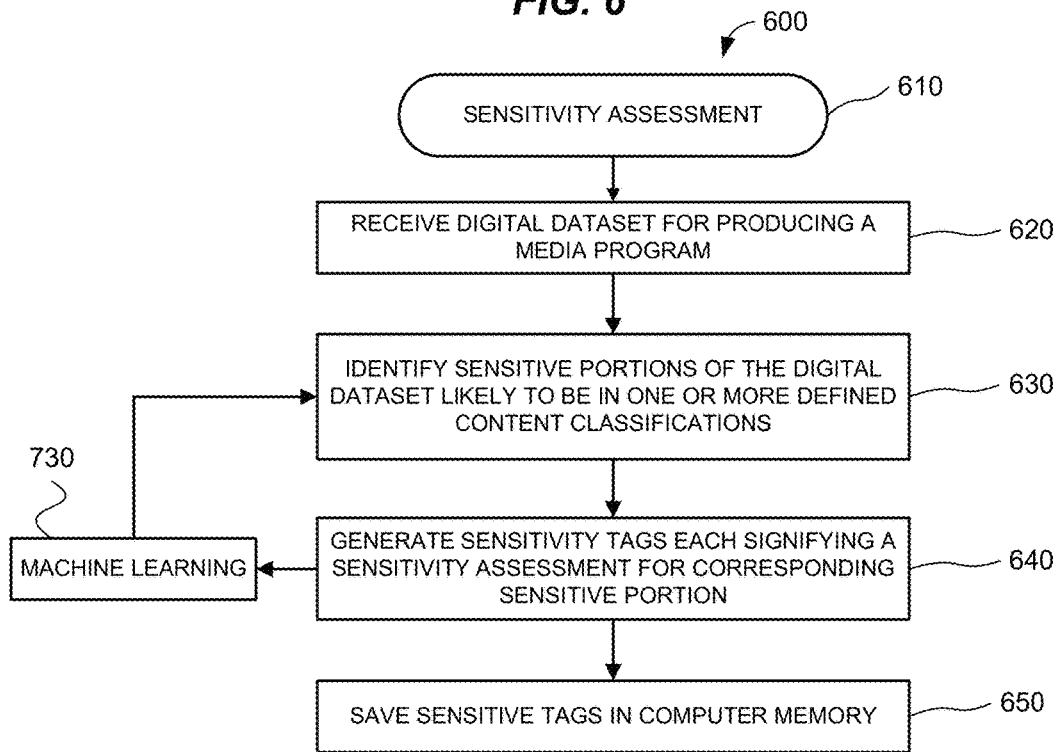
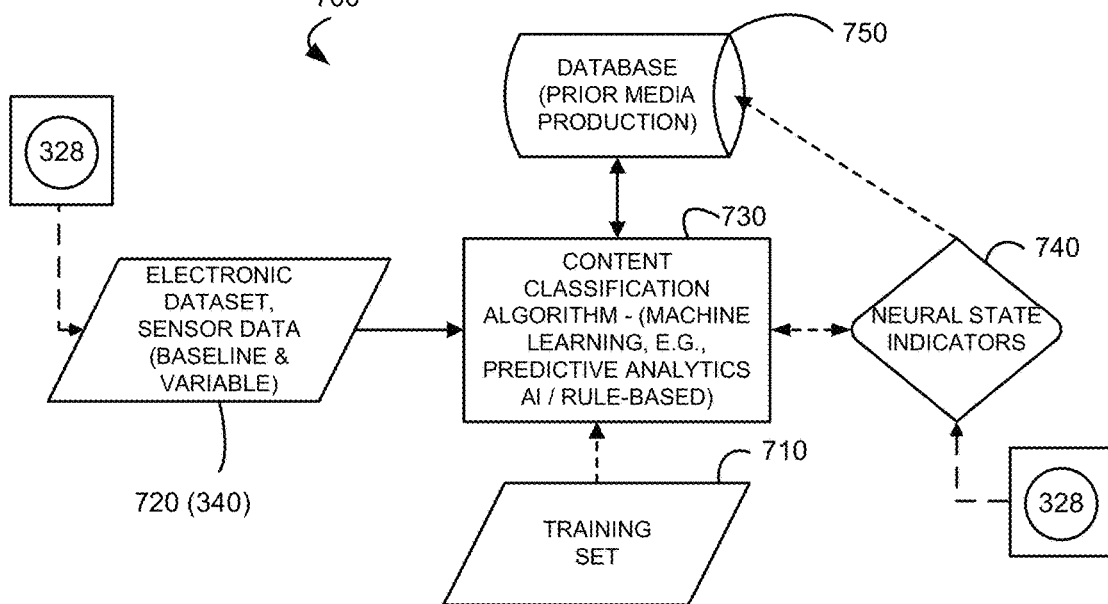

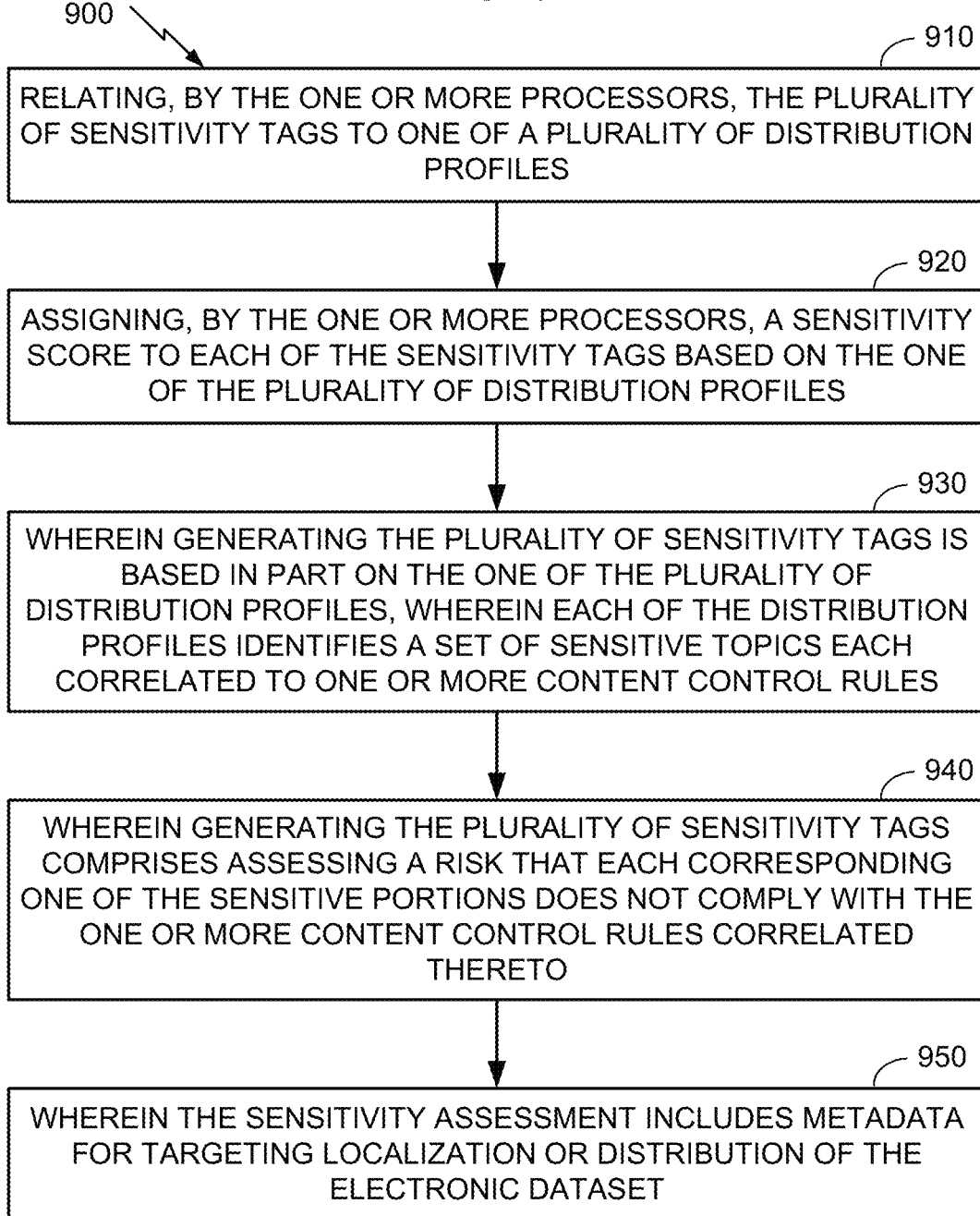

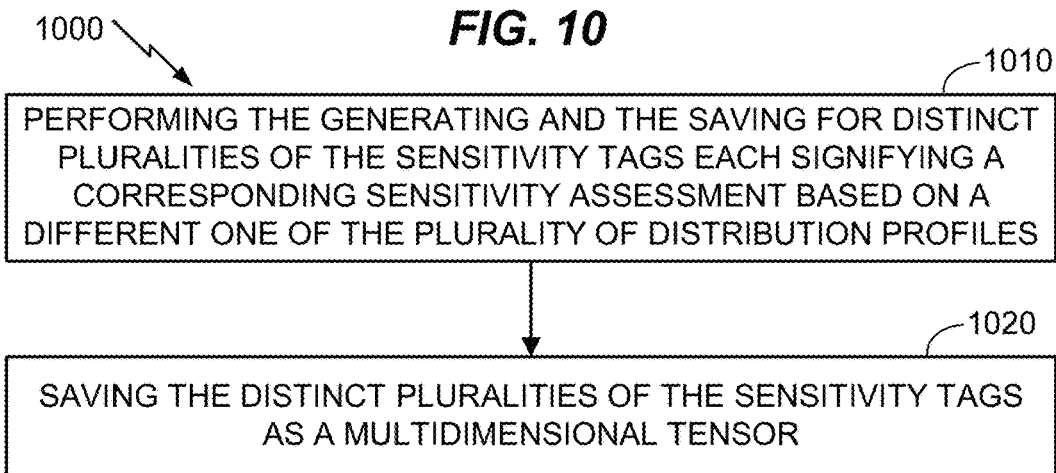
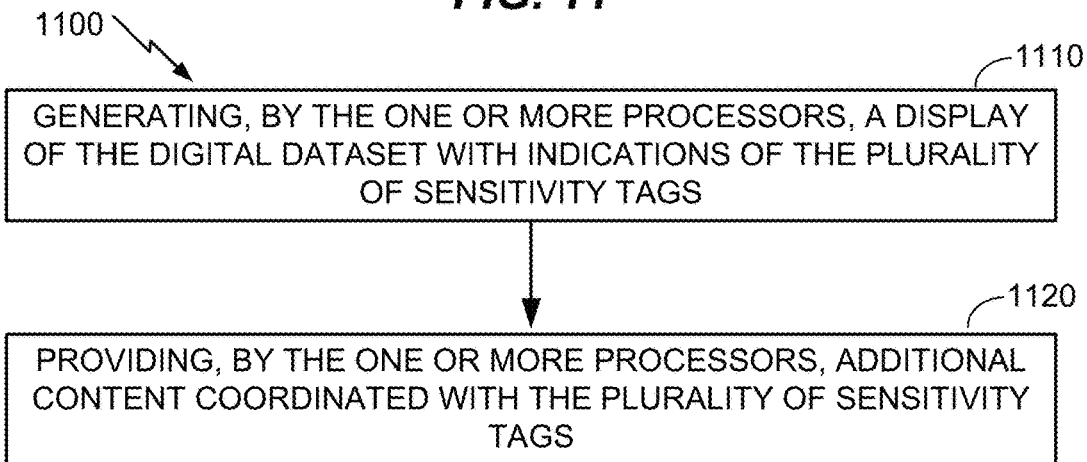
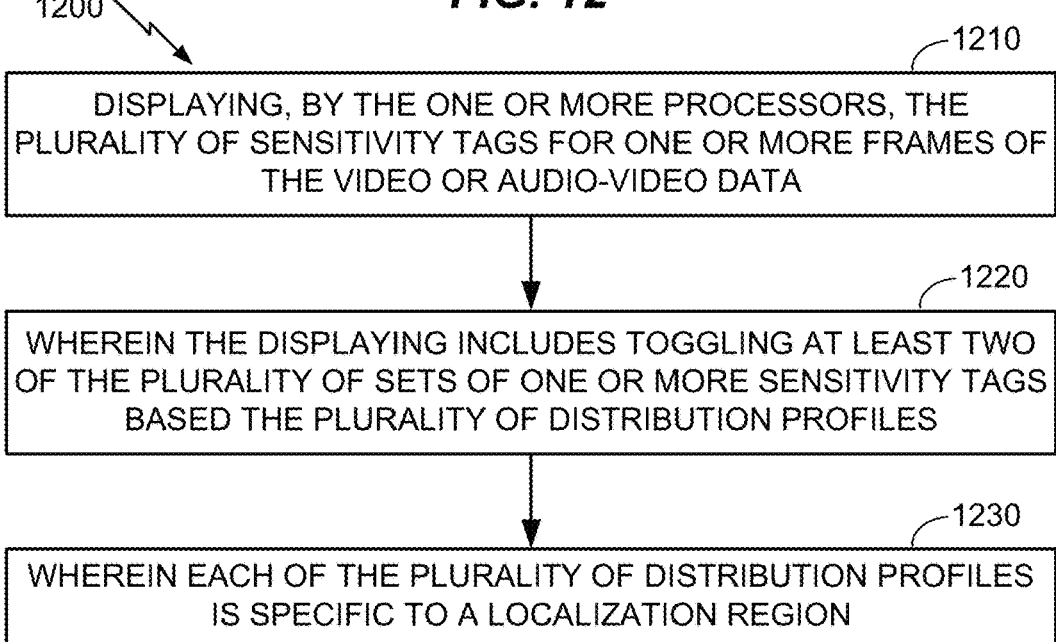

1310 — WHEREIN THE IDENTIFYING FURTHER COMPRISES USING ONE OR MORE MACHINE LEARNING COMPONENTS TRAINED TO RECOGNIZE SIMILARITY BETWEEN THE ONE OR MORE SENSITIVE PORTIONS AND THE CLASSIFIED PORTIONS OF THE PRIOR MEDIA PRODUCTION

1320 — WHEREIN THE IDENTIFYING FURTHER COMPRISES PREDICTING A LEVEL OF SENSITIVITY OF THE ONE OR MORE SENSITIVE EVENTS USING THE ONE OR MORE MACHINE LEARNING COMPONENTS

1330 — TRAINING, BY THE ONE OR MORE PROCESSORS, THE ONE OR MORE MACHINE LEARNING COMPONENTS USING AN ITERATIVE TRAINING ALGORITHM

1410 — WHEREIN THE SENSITIVITY ASSESSMENT INCLUDES, FOR EACH CORRESPONDING ONE OF THE SENSITIVE PORTIONS, A TYPE OF THE CORRESPONDING SENSITIVITY TAGS, AN INTENSITY MAP, A BAR GRAPH REPRESENTING A LEVEL OF SENSITIVITY, OR A COMBINATION THEREOF.

1420 — WHEREIN THE SENSITIVE PORTIONS ARE DEFINED BY AT LEAST ONE OF IMAGERY OR LANGUAGE PROHIBITED BY LAW OR FLAGGED FOR ONE OR MORE OF A LOCALIZATION ISSUE, A COMMERCIAL CONTRACT ISSUE, A CONTENT LICENSING ISSUE, A SCENE CHANGE INCONSISTENCY, AN UNRESOLVED FRAME COMPOSITION FOR ONE OR MORE PLATFORMS, AN END REEL CREDITS AMENDMENT, OR A COMBINATION THEREOF

1430 — WHEREIN THE CLASSIFIED PORTIONS OF THE PRIOR PRODUCTIONS ARE DEFINED BY AT LEAST ONE OF IMAGERY OR LANGUAGE PROHIBITED BY LAW OR FLAGGED FOR ONE OR MORE OF A LOCALIZATION ISSUE, A COMMERCIAL CONTRACT ISSUE, A CONTENT LICENSING ISSUE, A SCENE CHANGE INCONSISTENCY, AN UNRESOLVED FRAME COMPOSITION FOR ONE OR MORE PLATFORMS, AN END REEL CREDITS AMENDMENT, OR A COMBINATION THEREOF, USING AN ARTIFICIAL INTELLIGENCE ROUTINE TRAINED ON PRIOR CLASSIFIED DATA.

SENSITIVITY ASSESSMENT FOR MEDIA PRODUCTION USING ARTIFICIAL INTELLIGENCE

CROSS-REFERENCE TO RELATED APPLICATIONS

The present application claims priority pursuant to 35 U.S.C. § 119(e) to U.S. Provisional Patent Application Ser. No. 62/848,060 filed May 15, 2019, which application is incorporated herein by reference in its entirety.

FIELD

The present disclosure relates to methods and apparatus for automatically recognizing and assessing sensitivity elements in an electronic dataset for media production, for example, recognizing and assessing text, audio, and image data encoded in media production materials for cultural sensitivity.

BACKGROUND

Media production teams have a short window of time to assess content sensitivity and to create censorship edits for their theatrical slate, particularly when the media program is distributed in multiple territories and require localization. Within this timeframe, vendors and territory representatives view content multiple times and manually identify "sensitive events" to generate a censorship activities report for the media program. The large amount of censorship work, combined with the short delivery window, can prevent the production/localization teams from maximizing box office revenue. For example, in South Korea, a film cannot be advertised until the final edit is delivered, reviewed and approved by the local censorship board.

Human activity can be made more efficient by developing computerized workflow. But even with increased efficiency provided by online forms and data, a considerable amount of effort may still be required to recognize and prioritize sensitive elements of production that need to be cleared.

It would be desirable, therefore, to develop new methods and other new technologies for flagging sensitive portions of a digital dataset for media production that overcome these and other limitations of the prior art and deliver more robust and efficient technology to recognize and assess cultural sensitivity and censorship concerns associated with media production.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect, a computer-implemented method for flagging sensitive portions of a digital dataset for media production may include receiving, by one or more processors, the digital dataset comprising at least one of audio data, video data, or audio-video data for producing at least one media program. The electronic dataset for media production may include, for example, a post production audio-video source file and other documents containing encoded text, video data, image data, and audio data.

The method may further include identifying, by the one or more processors, sensitive portions of the digital dataset likely to be in one or more defined content classifications, based at least in part on comparing unclassified portions of the digital dataset with classified portions of the prior media production using an algorithm. The sensitive portions may include, for example, image types or phrases, including, but not limited to, objects/expressions that may be subject to censorship, such as casino chips, a glass containing an alcoholic drink, a man physically/verbally attacking another individual, a woman revealing her private parts, etc., but may also include: text in an image to flag for localization, products within an image to flag for advertisement sales and Clips & Stills Licensing, scene changes, frame composition to auto generate thumbnails for OTT platforms, credits from end reel to enhance talent information, etc.

The method may further include generating, by the one or more processors, a plurality of sensitivity tags each signifying a sensitivity assessment for a corresponding one of the sensitive portions. The sensitivity tags may include, for example, a color-coded classified content highlighting (boxes around areas within a video or audio frame for flagging sensitive events), time codes, frame/pixel coordinates, etc. The sensitivity assessment may include, for example, the type of each sensitive event, a heatmap of the sensitive events, and a bar graph representing a level of sensitivity of each sensitive event. The sensitivity assessment may be output as, for example, highlights or other region indicators in the digital images corresponding to the sensitive elements, a ranked or unranked listing of the sensitive elements, annotations noting a need for censorship clearance, or other indicator that brings the sensitive element to the user's attention in connection with a sensitivity level. Sensitivity levels may include two or more levels each representing a different sensitivity level by a consistent metric.

The method may further include saving the plurality of sensitivity tags each correlated to its corresponding one of the sensitive portions in a computer memory.

The method may further include relating, by the one or more processors, the plurality of sensitivity tags to one of a plurality of distribution profiles. The distribution profiles may include, for example, a censorship profile for a specific country or region.

The method may further include assigning, by the one or more processors, a sensitivity score to each of the sensitivity tags based on the one of the plurality of distribution profiles.

In an aspect, generating the plurality of sensitivity tags may be based in part on the one of the plurality of distribution profiles, wherein each of the distribution profiles identifies a set of sensitive topics each correlated to one or more content control rules. For example, in an aspect, generating the plurality of sensitivity tags may include assessing a sensitivity that each corresponding one of the sensitive portions does not comply with the one or more content control rules correlated thereto.

The method may further include performing the generating and the saving for distinct pluralities of the sensitivity tags each signifying a corresponding sensitivity assessment based on a different one of the plurality of distribution profiles. In an aspect, the method further includes saving the distinct pluralities of the sensitivity tags as a multidimensional tensor. For example, in an aspect, the tensor may be three-dimensional and may include components representing sensitivity tags, country profiles, levels of sensitivity, or other parameters relevant to sensitivity assessment.

The method may further include generating, by the one or more processors, a display of the digital dataset with indications of the plurality of sensitivity tags. In an aspect, the method may further include providing, by the one or more processors, additional content coordinated with the plurality of sensitivity tags. The additional content may include, for example, a note to guide post production localization, e.g., suggest what to substitute to save the scene, e.g., swapping an alcoholic drink appearing in the scene for a can of Coke; cropping, panning, or scanning the scene, removing a set of frames, or other guide for post-production localization.

The method may further include displaying, by the one or more processors, the plurality of sensitivity tags for one or more frames of the video or audio-video data. In an aspect, the displaying may include toggling at least two of the plurality of sets of one or more sensitivity tags based the plurality of distribution profiles. The toggling may include, for example, switching from a tab from one set (category of censorship) of classified contents to another tab. In an aspect, for example, users may toggle between distribution profiles, localization regions, and categories of sensitive events. The distribution profile may include, for example, categories of censorship, such as protests/riots, guns, violence, smoking, nudity, sex, alcohol, gambling, etc. In an aspect, each of the plurality of distribution profiles may be specific to a localization region. In an aspect, for example, the localization region may refer to a large region (e.g., Middle East, Latin America, etc.) which may include multiple countries. In an aspect, each country may have a specific distribution profile. For example, in an aspect, each localization region may include countries having the same content rules. In an aspect, the identifying may further include using one or more machine learning components trained to recognize similarity between the one or more sensitive portions and the classified portions of the prior media production. For example, the identifying may further include predicting a level of sensitivity of the one or more sensitive events using the one or more machine learning components. In another aspect, the method may further include training, by the one or more processors, the one or more machine learning components using an iterative training algorithm.

Machine learning or rules-based processing may also be informed by new information (e.g. current news releases or relevant legal dockets including any current infringement lawsuit by a relevant rights holder) so that current sensitivities not included in the training set can be recognized during automatic processing.

In an aspect, the sensitivity assessment may include, for each corresponding one of the sensitive portions, a type of the corresponding sensitivity tags, an intensity map (such as a heat map), a bar graph representing a level of sensitivity, or a combination thereof.

In an aspect, the sensitive portions may be defined by at least one of imagery or language prohibited by law or flagged for one or more of a localization issue, a commercial contract issue, a content licensing issue, a scene change inconsistency, an unresolved frame composition for one or more platforms, an end reel credits amendment, or a combination thereof. In an aspect, for example, the classified portions of the prior productions may be defined by at least one of imagery or language prohibited by law or flagged for one or more of a localization issue, a commercial contract issue, a content licensing issue, a scene change inconsistency, an unresolved frame composition for one or more platforms, an end reel credits amendment, or a combination thereof, and the comparing comprises providing at least the classified portions of the prior media production to an artificial intelligence routine as training input.

In an aspect, the sensitivity assessment may include metadata for targeting localization or distribution of the electronic dataset.

The method may be performed by a system or apparatus including one or more processors coupled to a computer memory holding program instructions that when executed by the one or more processors causes the system or apparatus to perform the method. The system or apparatus may include, or may be coupled to, an output device such as a display screen or printer for outputting the sensitivity assessment measures, alone or in combination with digital dataset for media production. In addition to the program instructions, the memory or separate memory resources may hold the production data, training data, and output data.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIG. 6 is a flowchart illustrating high-level aspects of a method for flagging sensitive portions of a digital dataset for media production.

FIG. 7 is a concept diagram illustrating a digital dataset for media production containing potential sensitive portions and flagging sensitive portions of the digital dataset according to one or more embodiments.

FIGS. 9-14 are flow charts illustrating further optional aspects or operations of the method diagrammed in FIG. 8.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form to facilitate describing these aspects.

Figure 1:
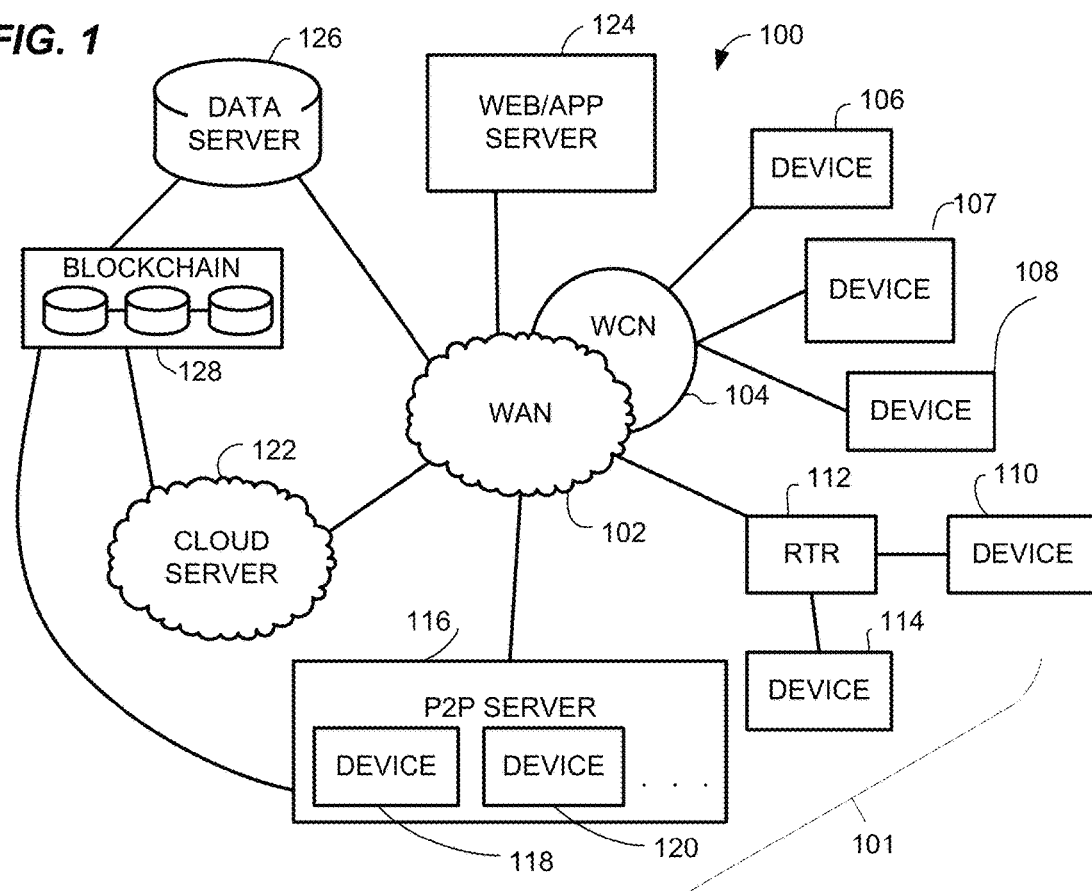
FIG. 1 is a schematic block diagram illustrating aspects of a system and apparatus for flagging sensitive portions of a digital dataset for media production, coupled to one or more client systems or devices, as described herein.

FIG. 1 illustrates aspects of an exemplary environment 100 in which a system and apparatus for implementing a method for flagging sensitive portions of a digital dataset for media production may operate. For example, in an aspect, in the device-server environment 100, the method allows for automatically flagging a frame of any movie or video, a region within the frame, or an audio clip, for culturally sensitive events, such as for example protests, riots, guns, violence, smoking, nudity, sex, alcohol, or events in other categories, as well as identifying which scene is acceptable by one localization territory versus another. Other architectures may also be suitable. Automation of the flagging may use one or more machine learning algorithms trained to categorize digital data into topical categories.

The methods may include using a digital dataset for media production including potential sensitive portions. As used herein, "digital dataset for media production" or "digital dataset" means text, audio, and/or image data (including video data or still image data) used in media production, e.g., post production audio-video source file. For example, in some aspect, the digital dataset may include a video file that is supported or otherwise may be processed by FFmpeg (https://ffmpeg.org/). As used herein, "sensitive portions" means portions of digital data a content producer or distributor desires to flag for usage in media production in view of cultural sensitivity, or other defined content classifications. Sensitive portions may include, for example, portions encoding expressions or images objects, brands, speech, text, and likenesses such as props, animals, vehicles, costumes, graphics items, audios, songs, actors, gestures or postures, or contexts for any of the foregoing. For further example, sensitive portions may include image types or phrases, including, but not limited to, objects/expressions that may be subject to censorship, for example, a frame of a movie or video presented with a culturally sensitive event, such as protests, riots, guns, violence, smoking, nudity, sex, alcohol, and so forth. For instance, a sensitive portion may include casino chips, a glass containing an alcoholic drink, a man physically/verbally attacking another individual, or nudity. In addition, a sensitive portion may include text in an image to flag for localization, products within an image to flag for advertisement sales and Clips & Stills Licensing, scene changes, frame composition to auto generate thumbnails for OTT platforms, credits from end reel to enhance talent information, or any other portion of interest.

The methods may include using the digital dataset which may include at least one of audio data, video data, or audio-video data for producing at least one media program. In an aspect, at a high level, the digital dataset may include sensitive portions likely to be in one or more defined content classifications, which may be identified based at least in part on comparing unclassified portions of the digital dataset with classified portions of the prior media production using a machine learning algorithm. For example, in some embodiments, the sensitive portions may be logged manually or identified by machine learning, using prior media production such as the corpus of actually produced movies or episodic shows to single out classify sensitive portions. For further example, the comparing may be done by training a machine-learning algorithm using the prior media production with the classified portions, and then processing the digital dataset using the trained algorithm. Further details of the electronic records as used herein will be discussed below, e.g., with reference to FIGS. 3C-3D.

In a network architecture, data for identifying sensitive portions of the digital dataset may be collected and processed locally or remotely, and used to identify sensitive portions, generate a plurality of sensitivity tags each signifying a sensitivity assessment for a corresponding one of the sensitive portions. In some embodiments, digital dataset may be received locally at the client devices, and a set of log data for the digital dataset may be provided to a remote server for improving the machine learning (e.g., predictive analytics) algorithms and tracking use. As used herein, "machine learning algorithm" may include any one or a combination of predictive analytics algorithm or a rules-based algorithm.

One or more processors (hereinafter individually or collectively referred to as a "processor") may generate a plurality of sensitivity tags each signifying a sensitivity assessment for a corresponding one of the sensitive portions. The processor may provide the sensitivity assessment to a user (e.g., users of a system or apparatus for flagging sensitive portions of the digital dataset for media production, such as post production staff and localization staff interacting with the environment 100 via software or hardware or both using a computer device 101.

Referring to FIG. 1, a suitable environment 100 may include various computer servers and other network entities including client device entities in communication via one or more networks, for example a Wide Area Network (WAN) 102 (e.g., the Internet) and/or a wireless communication network (WCN) 104, for example a cellular telephone network, using any suitable high-bandwidth wireless technology or protocol, including, for example, cellular telephone technologies such as 3rd Generation Partnership Project (3GPP) Long Term Evolution (LTE), 5G fifth-generation cellular wireless, Global System for Mobile communications (GSM) or Universal Mobile Telecommunications System (UMTS), and/or a wireless local area network (WLAN) technology using a protocol such as Institute of Electrical and Electronics Engineers (IEEE) 802.11, and equivalents thereof. The servers and other network entities (collectively referred to as "nodes") connect directly, dynamically and non-hierarchically to as many other nodes as possible and cooperate with one another to efficiently route data from/to client devices. This lack of dependency on one node allows for every node to participate in the relay of information. Mesh networks dynamically self-organize and self-configure. The servers can connect to client devices in a server-client structure. Some client devices can also act as servers.

Client devices may include, for example, computer devices 101 (FIGS. 1 and 2) such as smartphones, smart devices such as smart watches, notepad computers, laptop computers, desktop computers, mixed reality (xR) headsets, digital cameras, and special purpose media production controllers and servers.

Computer servers may be implemented in various architectures. For example, the environment 100 may include one or more Web/application servers 124 containing documents and application code compatible with World Wide Web protocols, including but not limited to HTML, XML, PHP and JavaScript documents or executable scripts, for example. The environment 100 may include one or more data servers 126 and/or cloud server 122 for holding data, for example video, audio-video, audio, graphical content components of interactive media content for consumption using a client device, software for execution on or in conjunction with client devices, for example sensor control and emotion detection applications, and data collected from users or client devices. Data collected from client devices or users may include, for example, production planning documents as described herein, user identity, user profile data, sensor data and application data. Data may be collected by a background (not user-facing) application operating on the client device, and transmitted to a data sink, for example, a cloud-based data server 122 or discrete data server 126. Application data means application state data, including but not limited to records of user interactions with an application or other application inputs, outputs or internal states. Applications may include software for recognition and assessment of production sensitivities and supporting functions. Applications and data may be served to one or more system nodes including devices 101 from one or more of the foregoing servers (e.g., 122, 124, 126) or other types of servers, for example, any server accessing a distributed blockchain data structure 128, or a peer-to-peer (P2P) server 116 including a peer-to-peer network such as a mesh network (including partial, full, and wireless mesh networks), such as may be provided by a set of devices 118, 120, etc., and the like, operating contemporaneously as micro-servers or clients. In an aspect, for example, if a particular set of territories has been or is currently litigating new clearance disputes, then a processor may recognize and factor in new clearance sensitivities by retraining a machine learning component using the new sensitivity information or applying of a rules-based algorithm module programmed to recognize new sensitivity profiles. Geographic sensitivity usually pertains to where the media program is to be distributed and to a lesser extent or not at all where the media is being originated.

In an aspect, information held by one or more of the content server 126, cloud-based content server 122, distributed blockchain data structure 128, or a peer-to-peer (P2P) server 116 may include a data structure or database of electronic records, which may include, but not limited to, media components such as text, audio, or image dataset, where each record may be correlated to one or more sensitive portions that were classified in one or more prior media productions. The data structure may relate user-perceivable aspects of digital dataset for media production to identifiers for classified sensitive portions, for example by using characteristic parametric values, and to one or more indicators of context-sensitive factors relevant to one or more sensitive portions, and other unique metadata sets characterizing each of the sensitive portions The network environment 100 may include various devices (collectively referred to as devices 101), for example a smartphone 106, a tablet 107, a smart device 108, etc., that may be connected to servers via the WCN 104 and/or WAN 102; any one of the foregoing device types including devices 118, 120, or a desktop 110 or a media production system 114 that may be connected to servers via a router 112 and the WAN 102 and/or WCN 104, and the like. In general, devices 101 may be, or may include or communicably connected to, computers used by users to provide the digital dataset for media production or to access the database of electronic records via a server or from local storage.

Figure 2:
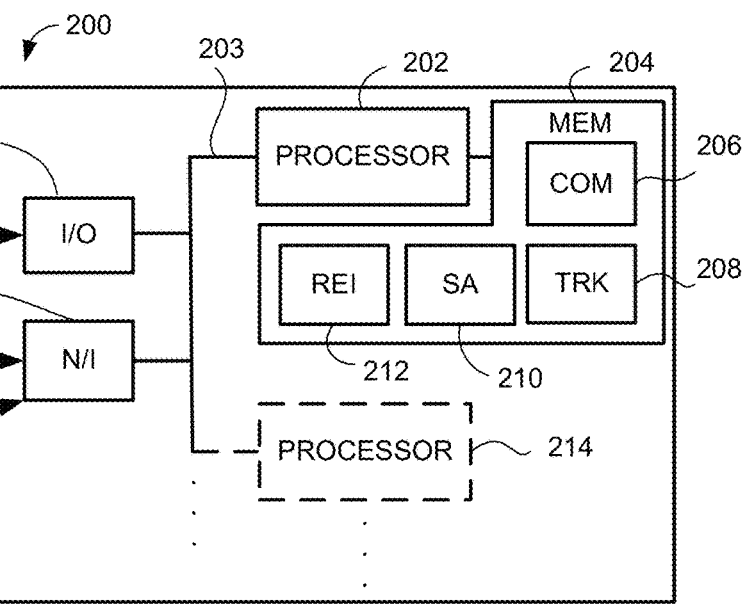
FIG. 2 is a schematic block diagram illustrating aspects of a server for flagging sensitive portions of a digital dataset for media production.

Referring to FIG. 2, the device 101 in the network environment 100 may include various computing devices, for example a media post-production terminal of a user, for example a post-production or localization staff. Other computing devices may include, for example, a tablet client, or a laptop client device, a mixed reality (e.g., virtual reality and augmented reality) client device, or a smart wearable device. The computing devices may connect to one or more networks. For example, the device 101 may connect to servers via a wireless access point (not shown) communicably connected to the wireless communications network (WCN) 104, the WCN 104 and the WAN 102, either directly or via a router/modem 112 or a mobile wireless access point (WAP). For further example, in a mobile mesh network 116, nodes 118, 120 may include small radio transmitters that function as a wireless router. The nodes 118, 120 may use the common Wi-Fi standards to communicate wirelessly with other devices, and with each other.

Figure 3A:
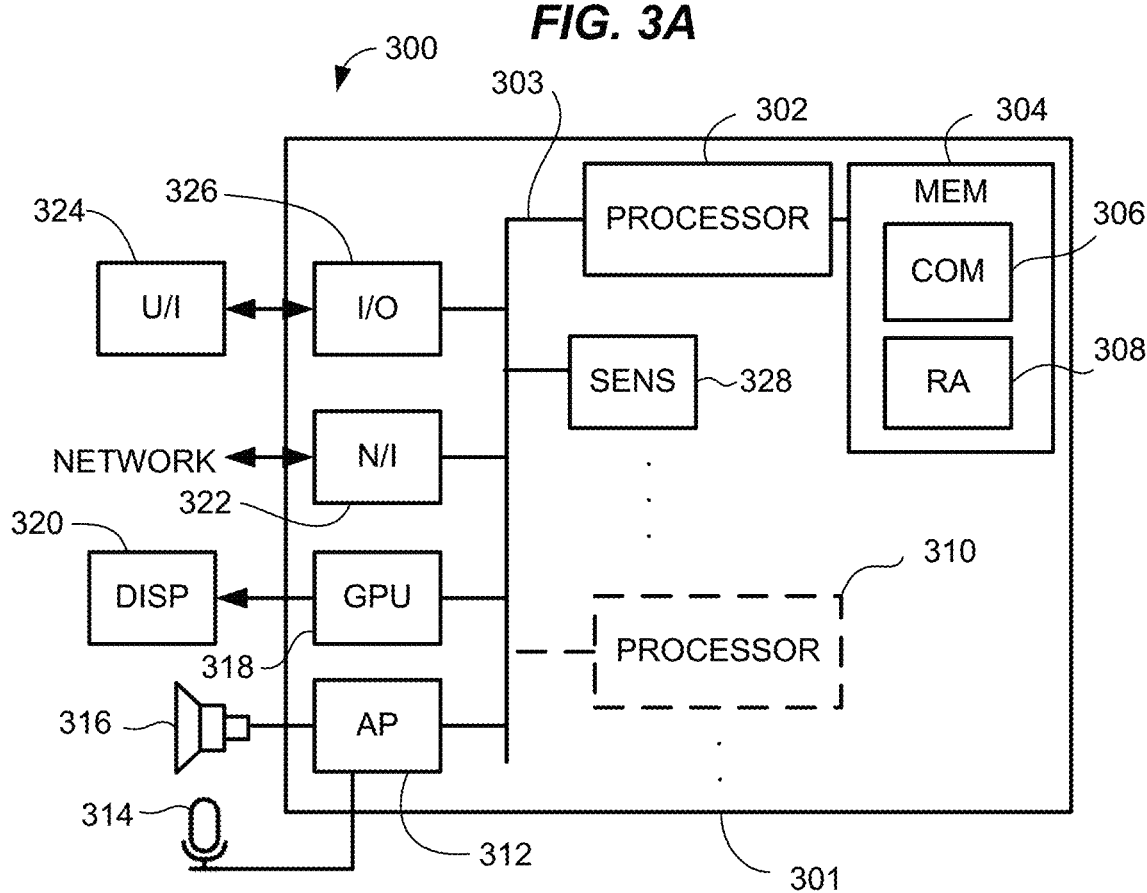
FIG. 3A is a schematic block diagram illustrating aspects of a client device for flagging sensitive portions of a digital dataset for media production.

FIG. 2 further shows a content classification (cultural sensitivity assessment) server 200 for flagging sensitive portions of a digital dataset for media production, which may operate in the environment 100, in similar networks, or as an independent server. The server 200 may include one or more hardware processors 202, 214 (two of one or more shown). Hardware may include firmware. Each of the one or more processors 202, 214 may be coupled to an input/output port 216 (for example, a Universal Serial Bus port or other serial or parallel port) to a source 220 for data indicative of text, audio, or image elements that are present in the digital dataset for media production, such as objects, expressions, texts, music, logos, brands, or symbols recognized by the processor or sensors (e.g., sensor(s) 328; FIG. 3A). The processor may control output of the digital dataset for media production responsive to the data, for example, by using a machine learning component. Any source that contains a derived sensitivity portion recognition may be useful for input to a machine learning algorithm of the machine learning component.

The server 200 may track content classifications and identification of sensitive portions across multiple media productions. Some types of servers, e.g., cloud servers, server farms, or P2P servers, may include multiple instances of discrete servers 200 that cooperate to perform functions of a single server. In some embodiments, the source 220 may be separately or additionally used for sensor data indicative of sensitive portions. Suitable sources may include, for example, Global Positioning System (GPS) or other geolocation sensors, one or more cameras configuring for capturing or recognizing props, brand logos, texts, or actor likenesses, microphones for capturing sounds such as copyrighted music or audio segments, and any other sensor useful for detecting a sensitive portion in a digital dataset for media production.

The server 200 may include a network interface 218 for sending and receiving applications and data, including but not limited to application and sensor data used for flagging sensitive portions of a digital dataset for media production. The digital dataset may be received by the server 200 from a device 101 or stored locally by the client device. If stored local to the client device, the client and server 200 may cooperate to handle sensitive portion data, sensor data and other content classification/sensitivity assessment functions (flagging sensitive portions). In some embodiments, the client may handle all content classification or sensitivity assessment functions and the server 200 may be used for tracking only or may not be used at all. In other embodiments, the server 200 performs content classification or sensitivity assessment functions.

Each processor 202, 214 of the server 200 may be operatively coupled to at least one memory 204 holding functional modules 206, 208, 210, 212 of an application or applications for performing a method as described herein. The modules may include, for example, a communication module 206 for communicating with client devices and servers. The communication module 206 may include instructions that when executed by the processor 202 and/or 214 cause the server to communicate control data, sensitive portion data, and sensor data with a client device via a network or other connection. A tracking module 208 may track prior or concurrent sensitivity assessments for adding to training databases for training a machine-learning module to identify potential sensitive portions and/or assess a measure of sensitivity for identified portions of the digital dataset.

The modules may further include a sensitivity assessment (SA) module 210. The SA module 210 may include instructions that when executed by the processor 202 and/or 214 cause the server 200 to perform one or more of assembling or configuring a plurality of sensitivity tags each signifying a sensitivity assessment for a corresponding one of the sensitive portions, and further operations as described in more detail herein below that when executed by the processor causes the server to perform any one or more of the functions described herein for flagging sensitive portions of a digital dataset for media production. In alternative embodiments, the SA module 210 may be omitted from the server memory 204 and provided in the memory of a client device. The memory 204 may contain additional instructions, for example an operating system, and supporting modules.

The modules may include, for example, a sensitivity portion identification (SPI) module 212. The SPI module 212 may include instructions that when executed by the processor 202 and/or 214 cause the server to perform one or more of identifying sensitive portions of the digital dataset, likely to be in one or more defined content classifications, based at least in part on comparing unclassified portions of the digital dataset with classified portions of the prior media production using an algorithm. For example, the SPI module 212 may apply a rule-based algorithm, a heuristic machine learning algorithm (e.g., a deep neural network, hereinafter "predictive analytics algorithm") or both, to create one or more sets of identifiers consistent with the input parameters. In an aspect, the comparing may be done by training a machine-learning algorithm using the prior media production with the classified portions, and then processing the digital dataset using the trained algorithm to identify likely classified portions for flagging. In some embodiments, the SPI module 212 may apply the rule-based algorithm or the heuristic machine learning algorithm to data indicative of objects, brands, and likenesses of potential interest (i.e., presenting potential legal clearance issues), thereby identifying sensitive portions useful for a sensitivity assessment algorithm. The SPI 212 when executed by the processor may cause the server to assign a likelihood of a targeted outcome, e.g., a defined sensitivity tag targeted for the digital dataset, for specific sensitivity events. The SPI module 212 may perform other or more detailed operations for identifying sensitive portions as described in more detail herein below.

Referring to FIG. 3A, aspects of a media production user apparatus 300 for obtaining and/or sending a digital dataset for media production including potential sensitive portions are described. In some embodiments, the same computing device (e.g., apparatus 300) may operate both as a sensitivity assessment client apparatus and as a sensitivity assessment server, for example, as a node of a mesh network. In such embodiments, the computing device may also include functional modules and interface devices as described above for the server 200.

The apparatus 300 may be, or may be located in, a device 101. The client 300 may include a processor 302, for example a central processing unit based on 80x86 architecture as designed by Intel™ or AMD™, a system-on-a-chip as designed by ARM™, or any other suitable microprocessor(s). The processor 302 may be communicatively coupled to auxiliary devices or modules of the media production user apparatus 300, using a bus or other coupling. In some aspect, the processor 302 and its coupled auxiliary devices or modules may be housed within or coupled to a housing 301, for example, a housing having a form factor of a smartphone, a tablet, wearable goggles, glasses, visor, laptop computer, wearable device, desktop computer, or other form factors.

Figure 3B:
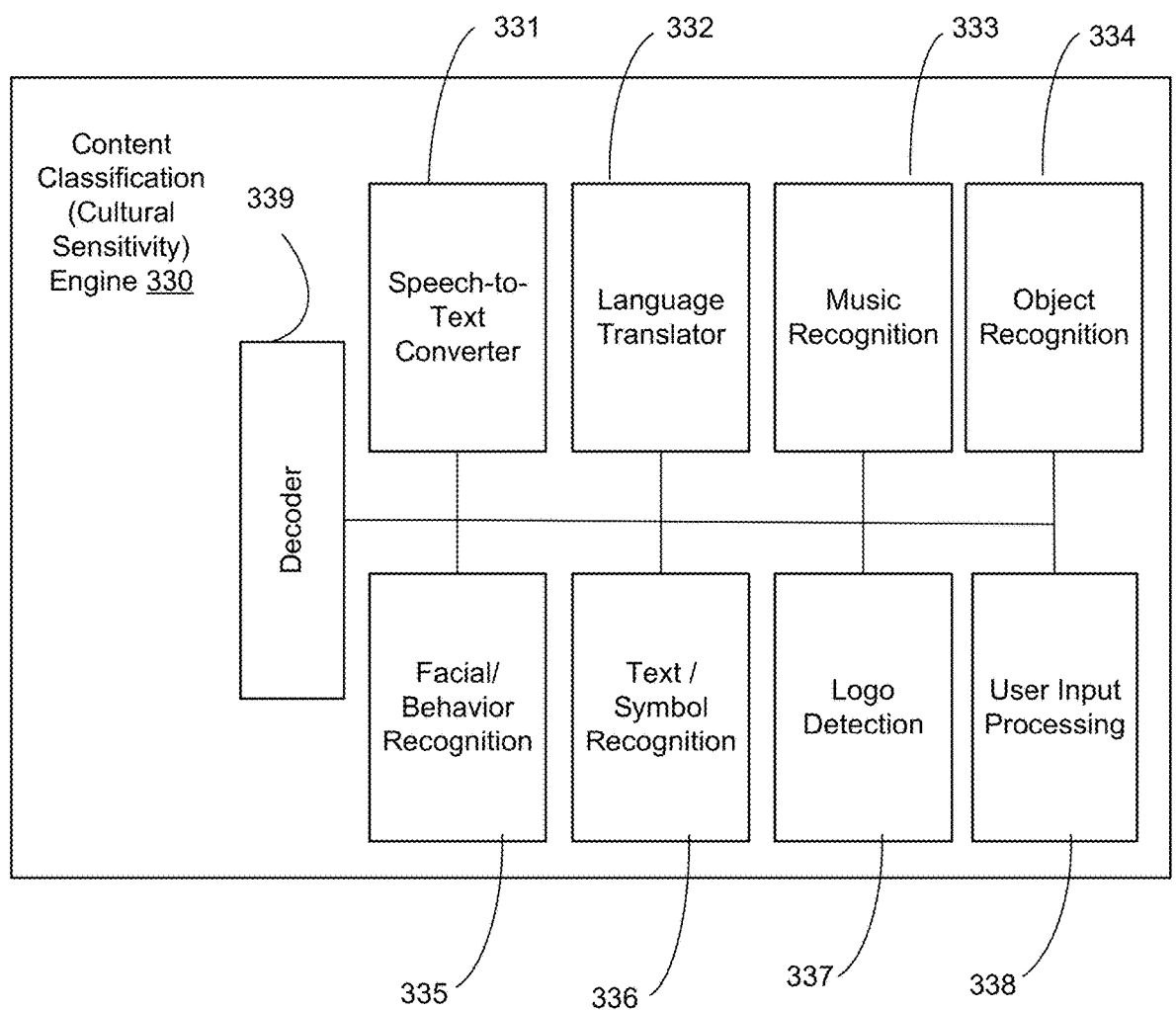
FIG. 3B is a block diagram illustrating aspects of functional modules making up an engine for performing methods for flagging sensitive portions of a digital dataset for media production as described herein.

A user interface device 324 may be communicably coupled to the processor 302 for providing user control input to a sensitivity assessment process as described herein. The process may include outputting or saving the plurality of sensitivity tags each correlated to its corresponding one of the sensitive portions in a computer memory. In some embodiments, the sensitivity assessment process may include, text, audio, and/or image output for sensitivity assessment processes of potential sensitive portions in media production materials operated by a sensitivity assessment (content classification or cultural sensitivity) engine (e.g., 350; FIG. 3B) executing on the processor 302 (or alternatively or in conjunction, on processors 202 and/or 214); FIG. 2).

User control input may include, for example, selections from a graphical user interface or other input (e.g., textual or directional commands) generated via a touch screen, keyboard, pointing device (e.g., mouse, trackpad or trackball), microphone, motion/gesture sensor, camera, or some combination of these or other input devices represented by block 324. Such user interface device 324 may be coupled to the processor 302 via an input/output port 326, for example, a Universal Serial Bus (USB), Bluetooth®, Wi-Fi™, or equivalent ports. Control input may also be provided via one or more sensors 328 coupled to the processor 302. The sensors 328 may include, for example, a motion sensor (e.g., an accelerometer), a position sensor, a camera or camera array (e.g., stereoscopic array), an eye-tracking sensor, or a microphone or a microphone array for user input. In some aspect, any or all of the sensors 328 may be housed in a single or multiple devices, such as a smartphone and the like.

The apparatus 300 or a connected server may track identification of sensitive portions and generation of identifiers for the identified sensitive portions as sensitivity assessment history. Sensitivity assessment history may include a record of sensitivity portion identification decisions made in response to a digital dataset for media production and other input from user devices. Sensitivity assessment history may also include a plurality of sensitivity tags for the identified sensitive portions each signifying a sensitivity assessment for a corresponding one of the sensitive portions. The server 200 may track user actions and sensitivity assessments across multiple media productions or a corpus of actually produced media materials (e.g., movies, episodic shows, theater performances, or the like). In an aspect, the server may process not just sensitivity assessment history, but also current information about current sensitivity flagging issues and territories of concern. For example, current events such as some new identification of potential legal clearance litigation or territories of concern may also feed the apparatus 300 that tracks sensitivity items.

Sensor data from the one or more sensors 328 may be processed locally by the CPU 302 to generate a digital dataset for media production, and/or transmitted to a server 200 for processing by the server in real time, or for non-real-time processing. As used herein, "real time" refers to processing responsive to user input without any arbitrary delay between inputs and outputs; that is, that reacts as soon as technically feasible. "Non-real time" refers to batch processing or other use of sensor data that is not used to provide immediate control input for controlling the display, but that may control the display after some arbitrary amount of delay.

To enable communication with another node of a computer network, for example the sensitivity assessment server 200, the client 300 may include a network interface 322, e.g., an Ethernet port, wired or wireless, or a 4G/LTE/5G cellular communications network interface, etc. Network communication may be used, for example, to enable multi-user interaction with sensitivity assessment data. Network communication can also be used for data transfer between the client 300 and other nodes of the network, for purposes including data processing, content delivery, content control, and tracking. The client 300 may manage communications with other network nodes using a communications module 306 that handles application-level communication needs and lower-level communications protocols, preferably without requiring user management.

A display 320 may be coupled to the processor 302, for example via a graphics processing unit 318 integrated in the processor 302 or in a separate chip. The display 320 may include, for example, a flat screen color liquid crystal display (LCD) illuminated by light-emitting diodes (LEDs) or other lamps, a projector driven by an LCD or by a digital light processing (DLP) unit, a laser projector, a light field display (e.g., support near-eye solution and far-eye solution, or generate images from different planes a-la wave guide bending), a pass-through display (e.g., a head-mounted virtual retinal display by Magic Leap, Inc. (Plantation, Fla.)) or other digital display device. Other digital display devices may also be used.

The display device 320 may be incorporated into the device or may reside separately from and communicably connected to the device, for example, as a separate display unit such as a flat screen TV or a computer monitor located in a media production studio or set. Video output driven by a content classification/sensitivity assessment (clearance) engine operating on the processor 302, or other application for coordinating user inputs with the sensitivity assessment, may be provided to the display device 320 and output as a video display to the user. Similarly, an amplifier/speaker or other audio output transducer 316 may be coupled to the processor 302 via an audio processor 312. Audio output correlated to the video output and generated by the sensitivity assessment module 308, a sensitivity assessment (content classification or cultural sensitivity) engine or other application may be provided to the audio transducer 316 and output as audible sound to the user. The audio processor 312 may receive an analog audio signal from a microphone 314 and convert it to a digital signal for processing by the processor 302. The microphone can be used as a sensor for detection of potential sensitivity elements and as a device for user input of verbal commands, or for social verbal responses to other users.

The media production user apparatus 300 may further include a random-access memory (RAM) 304 holding program instructions and data for rapid execution or processing by the processor during media production sensitivity assessment in response to accessing an electronic dataset for planning a media production. When the client 300 is powered off or in an inactive state, program instructions and data may be stored in a long-term memory, for example, a non-volatile magnetic, optical, or electronic memory storage device (not shown). Either or both RAM 304 or the storage device may include a non-transitory computer-readable medium holding program instructions, that when executed by the processor 302, cause the device 300 to perform a method or operations as described herein. Program instructions may be written in any suitable high-level language, for example, C, C++, C#, JavaScript, PHP, or Java™, and compiled to produce machine-language code for execution by the processor.

Program instructions may be grouped into functional modules 306, 308, to facilitate coding efficiency and comprehensibility. The modules, even if discernable as divisions or grouping in source code, are not necessarily distinguishable as separate code blocks in machine-level coding. Code bundles directed toward a specific type of function may make up a module, regardless of whether machine code on the bundle can be executed independently of another machine code. The modules may be high-level modules only. The sensitivity assessment module 308 may perform operations of any method described herein, and equivalent methods, in whole or in part. Operations may be performed independently or in cooperation with another network node or nodes, for example, the server 200.

FIG. 3B illustrates aspects of functional modules that may comprise an apparatus or application executed by the processors 202 or 214 of server 200 or processors 302 or 310 of the client 300, such as a content classification/cultural sensitivity assessment engine 330, for performing methods for flagging sensitive portions of digital dataset for media production according to one or more embodiments of the instant disclosure.

For example, the content classification/cultural sensitivity assessment engine 330 may be a censorship engine, which may be used in the context of recognizing and assessing content sensitivity for text, audio, character and image elements that may be present in a media production material such as digital dataset 340 for media production (FIG. 3C) that is intended for distribution in multiple territories and that requires localization. For example, the content classification/cultural sensitivity assessment engine 330 may be used as a localization tool that identifies culturally sensitive portions of the electronic dataset 340, or in addition thereto, in whole or in part. A content classification/cultural sensitivity assessment engine 330 or the like may also include other modules, for example a database module holding text (e.g., brand logos, copyrighted phrases, etc.), audio (such as songs and music), image (e.g., graphic logos, digital rights management data, video clips, and so forth) and parameter data, which are not illustrated. A digital dataset received from a user device (e.g., device 101) may be provided to a user input processing module 338. Based on the data signals and the context in which it is received (e.g., media production state at the time of receipt such as the version of the media post production, in which territory the media production material is intended for localization, or other context), the data processing module 338 may set variables or write data to memory locations that are used by other modules of the content classification/cultural sensitivity assessment engine 330, operating concurrently or sequentially with operation of the user input module 338. More detailed algorithms for performing functions of the sensitivity assessment engine 330 are described elsewhere below. It should be appreciated that the engine 330 need not include all the modules shown or described in connection with FIG. 3B. Other useful combinations of the modules including combination in which one or more of the modules are omitted or one or more other modules are added would be apparent for those skilled in the art.

Figure 3C:
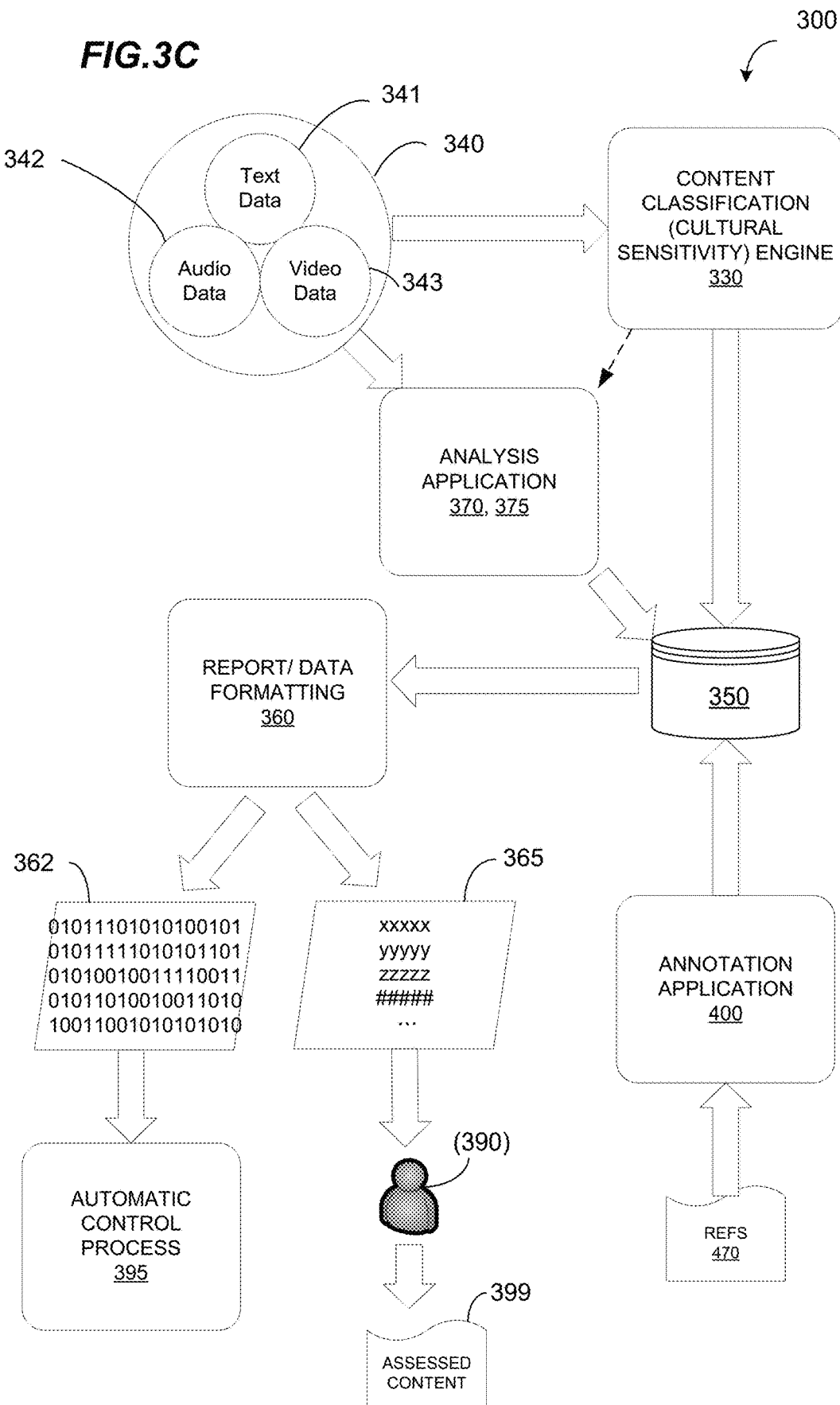
FIG. 3C is a block diagram illustrating aspects of input and output for performing methods for flagging sensitive portions of a digital dataset for media production as described herein.

Referring to FIG. 3C, in one or more embodiments, the content classification/cultural sensitivity assessment engine 330 may receive or otherwise access a digital dataset 340 for media production that may include text data 341, audio data 342, image (video) data 343, or a combination thereof, which includes one or more potential sensitive portions likely to be in one or more defined content classifications. For example, the digital dataset 340 may be a post-production audio-video source file that contains lines spoken by one or more actors, or songs sung by actors or played back from a prior recording. As used herein, "audio data" may include sound such as music or songs and vocal utterances (human or non-human such as animals) such as dialogue, speech, audible background voices (TV, speech, radio, etc.). The sound and vocal instances should be discernable by humans when played back at normal volume. For example, in some embodiments, the sound and vocal instances are within the hearing range of humans.

The content classification/cultural sensitivity assessment engine 330 may include a speech-to-text converter module 331. In an implementation, the speech-to-text converter module 331 may extract sound or vocal instances from an audio data 342. The speech-to-text conversion may improve turnaround times of clearing sensitive portions in a media production compared to using manual or semi-manual transcription known in the art. Using speech-to-text conversion by the speech-to-text converter module 331 may also reduce time pressures to creative teams by supplying reference materials faster and more accurately for flagging sensitive portions of a digital dataset for media production. As used herein, the term "speech-to-text converter" refers to any system capable of converting audio into a text representation or copy of the audio. The speech-to-text converter module 331 may also be referred as a speech recognition (SR) module, which may recognize the speeches into texts. Various speech recognition techniques may be used at the speech-to-text converter module 331. For example, a speech-to-text software application and the hardware suitable for executing such application that are known in the art would be considered a speech-to-text converter. A system that is configured to produce text from audio-video data may include a component that receives audio-video data, and a component that provides speech-to-text conversion.

The content classification/cultural sensitivity assessment engine 330 may further include a language translator module 332. As used herein, the term "language translator" refers to systems capable of converting audio or text from one language into another language. For example, the language translator module 332 may comprise translation software (e.g., software that is capable of converting text in one language to text in another language), which may or may not work in conjunction with human translators. Any suitable language translator may be used.

The content classification/cultural sensitivity assessment engine 330 may further include a music recognition module 333. In some implementations, the music recognition module 333 uses audio fingerprinting to recognize music content present in the dataset 340. Any suitable technique for music recognition may be used. An audio fingerprint is a condensed, machine-generated digital summary generated from an audio signal, which can be used to identify an audio sample or quickly locate similar items in an audio database. Music identification using audio fingerprints may be used to monitor the use of specific musical works and performances on radio broadcast, records, CDs and peer-to-peer networks. In an aspect, the music recognition module 333 may be used to identify or verify music clearance information such as copyright compliance, licensing, and other monetization schemes for the recognized music content. In an aspect, symbolic indications of audio fingerprinting or recognized music may be used in a process that automatically generates annotations for use in flagging sensitive portions of a digital dataset for media production as envisioned herein.

The content classification/cultural sensitivity assessment engine 330 may further include an object recognition module 334 and/or a facial/behavior recognition module 335. As used herein, "object recognition" refers to a technology capable of identifying or verifying an object from a digital image or video frame from a video source, and "facial recognition" or "behavior recognition" refers to a technology capable of identifying or verifying a person or behavior from a digital image or a video frame from a video source. Multiple methods are known in which object or facial/behavior recognition systems work. For example, in some implementations, the object recognition module 334 may compare predetermined object features from a given image or video frame with objects within a database, and the facial recognition module 335 may similarly compare predetermined facial features or behaviors from a given image or video frame with faces or behaviors within a database. In some embodiments, the object recognition module 334 and the facial/behavior recognition module 335 may each be an artificial intelligence (AI) based application that can uniquely identify an object or a person by analyzing patterns based on the object's textures and shape, and the person's facial textures and shape. In some embodiments, the object recognition module 334 and the facial/behavior recognition module 335 receive digital image decoded by the decoder 339, which it generates from a dataset 340 received or accessed by the content classification/cultural sensitivity assessment engine 330. In some embodiments, the decoder 339 may convert the image data 343 contained in the dataset 340, for example, a video data encoded in MP4, AVI, FLV, MOV, DVD (VOB), DVR-MS RM, MPEG file format or the like, into a digital image (or a seriate image), for example in JPG, BMP, GIF, TGA, TIF, PCX, PNG, and ICO file format or the like. The digital images may include data including still images and moving images. Alternatively, the object recognition module 334 and the facial/behavior recognition module 335 may receive digital image from the user input processing module 338, which may receive or process digital image input received by the computing apparatus 100 from a user.

In some implementations, the object recognition module 334 and the facial/behavior recognition module 335 detects the object, and the face or behavior of a person, respectively, from the received digital image. The object or facial/behavior recognition (detection) can be performed by using a predetermined algorithm. For example, in some implementations, a convolutional neural network (CNN) known in the art may be used, which hierarchically detects features including low-order features such as edges and high-order features such as eyes and a mouth and finally detects the barycentric position of the face. For example, a processor may implement a CNN to obtain the barycentric position of key features of an object, or of a face such as an eye or mouth. Of course, other features of an object or a face may be used. For further example, a processor may implement an algorithm for analyzing the relative position, size, and/or shape of the eyes, nose, cheekbones, jaw, and other features. These features may then be used to search for other images with matching features. Other known recognition algorithms that may be used by the object recognition module 334 and the facial/behavior recognition module 335 in one or more embodiments of the instant disclosure include principal component analysis using eigenfaces, linear discriminant analysis, elastic bunch graph matching using the Fisherface algorithm, the hidden Markov model, the multilinear subspace learning using tensor representation, and the neuronal motivated dynamic link matching. In an aspect, symbolic indications (symbolic combinations) of recognized objects and faces (referents) may be used in a process that automatically generates annotations for use in media production sensitivity assessment.

The content classification/cultural sensitivity assessment engine 330 may further include a text/symbol recognition module 336. In some implementations, the text/symbol recognition module 336 performs optical character recognition and symbol (string) matching to recognize text or symbol content present in the dataset 340. Any suitable technique for text/symbol recognition may be used. In an aspect, optical character recognition may detect words, phrases, and other strings of characters and symbols, including foreign languages. For instance, optical character recognition may be used to detect trademarks (e.g., word marks, and other text or symbol portions), copyrighted phrases, brand names, and logos appearing in digital dataset for media production. In an aspect, optical character recognition may be used in a process that automatically generates annotations for use in flagging sensitive portions of a digital dataset for media production as envisioned herein.

The content classification/cultural sensitivity assessment engine 330 may further include a logo recognition module 337. As used herein, "logo recognition" refers to a technology capable of identifying or verifying a logo from a digital image or video frame from a video source. Multiple methods are known in which logo recognition systems work. For example, in some implementations, the logo recognition module 337 may compare predetermined logo features from a given mage or video frame with objects within a database, similar to the object recognition module 334 and the facial/behavior recognition module 335 that uses data mining techniques and recognition algorithms (e.g., neural network) described above, except there are some substantial differences between logos and such categories of recognition. For example, automatic learning of face models depends on face detection, whereas general logo detection is not practical. In some embodiments, the logo recognition module 337 may be an artificial intelligence (AI) based application that can uniquely identify a logo by analyzing patterns based on the logo's edge contours, e.g., by using Generalized Hough Transform, keypoints (features), e.g., by using scale-invariant feature transform (SIFT) or Speeded Up Robust Features (SURF), and signature scan lines (e.g., if the logo if very distinctive, it would have a characteristic, scale-invariant signature in the scan lines, such as horizontal, vertical, and diagonal), etc. Any suitable technique for logo recognition and image pattern analysis may be used. For example, various techniques known in the fields of computer vision and image processing may be employed in training or applying the models for the AI application. For example, the sensitivity assessment engine 330 may use cross correlation techniques and/or a neural network with a region proposal network in order to localize a logo within an image in the image data 343, such as to determine a bounding box around the logo.

In some embodiments, the logo recognition module 337 may receive digital image decoded or pre-processed (i.e., transformed into a more raw form to give to the logo detection module 337, such as noise filtering, changing color domains to create binary B/W image) by the decoder 339, which it generates from a dataset 340 received by the content classification/cultural sensitivity assessment engine 330.

In an aspect, symbolic indications (symbolic combinations) of recognized logos (referents) may be used in a process that automatically generates annotations for use in flagging sensitive portions of a digital dataset for media production.

In some embodiments, for each instance where AI based application is used in the functional modules 331-337 of the content classification/cultural sensitivity assessment engine 330, two or more neural networks may have been trained using different neural network architectures, but with the same training data. In some aspect, the machine learning component of the AI application may be trained using an iterative training algorithm. A weighted sum or other known process may be used to determine an overall result based on the application of the multiple models.

As shown in FIG. 3C, the content classification/cultural sensitivity assessment engine 330 may be combined with one or more other applications 370, 375, 450 described in connection with FIG. 3E. Functions of the applications or engines 330, 370, 375, or 450 may be combined variously in any one or plurality of different applications, engines, or modules. The specific arrangement shown in FIG. 3B is for convenient example only.

FIG. 3C shows an overview of a process 300 that accepts input, for example digital dataset 340 for media production including potential sensitive portions. The dataset 340 may include text data 341, audio data 342, and image data 343, and outputs a plurality of sensitivity tags 350 each signifying a sensitivity assessment for corresponding one of the sensitive portions for storage in a computer memory. A report writing or data formatting module 360 may access the plurality of sensitivity tags 350 to produce one or more reports, for example, a package of machine-readable metadata 362 or a human-readable media production material 365 formatted to enable a human user 399 to prepare sensitivity assessed content 399 in an efficient manner. The automatic sensitivity assessment process 380 may be used to operate a machine for interacting with humans, for example, a social robot, content curator, or media player.

Figure 3D:
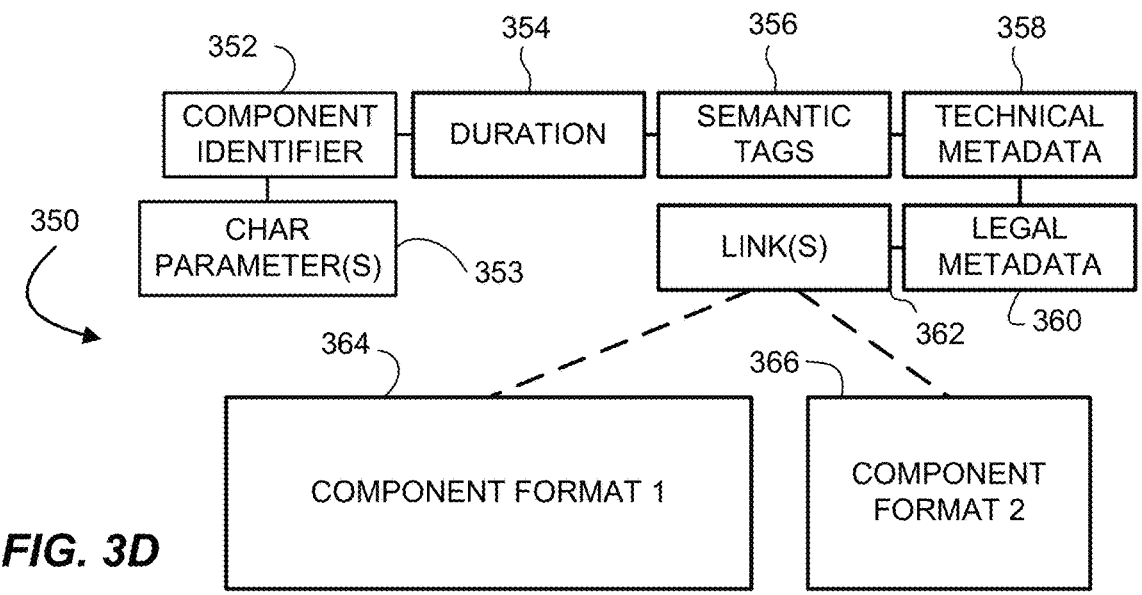
FIG. 3D is a schematic block diagram illustrating an example of a data structure for relating components of digital dataset to a set of sensitivity tags.

Referring to FIG. 3D, systems, apparatus and methods as described herein may make use of a data structure that relates digital dataset 340 for media production to one or more parameters for sensitivity assessment, including at least one or more indicators of semantic meaning relevant to one or more context- or culturally-sensitive factors or events. FIG. 3D shows an example of a data structure 350 for relating content components of digital dataset 340 each referenced by a component identifier 352 and a character parameter 353 which may include actor or character identity, target (e.g., objects, expressions, brands, likenesses) profile including scene focus data and actor handling data, and/or other data. The data structure may be implemented as a multidimensional tensor, a relational database, a NoSQL database such as a graph database, a flat data table, a distributed ledger, or by any other useful computer-readable digital data structure for storing, locating and accessing related components of binary-encoded data. The data structure 350 may include self-associated records each including a unique identifier 352 of a content component (e.g., an index number), a character parameter 353 (e.g., classifying the target profile), a duration 354 value (e.g., frames or seconds) of a content segment if applicable, one or more semantic tags 356 relevant to context- or culturally-sensitive factors or events, technical metadata 358 as needed to select, configure or produce a set of sensitivity assessment measures for classified content. The copies 364, 366 may be identical copies for redundancy or more efficient distribution, may be copies in different formats (e.g., a large format 364 and a small format 366) for different output modes, or both. It may be efficient to store the copies 364, 366 in a different storage system than the metadata 350 for more efficient operation of the server 200. For example, the server 200 may load the data structure 350 into its Random Access Memory (RAM) and access the component copies 364, 366 on a remote server or local magnetic or electronic memory device.

Figure 3E:
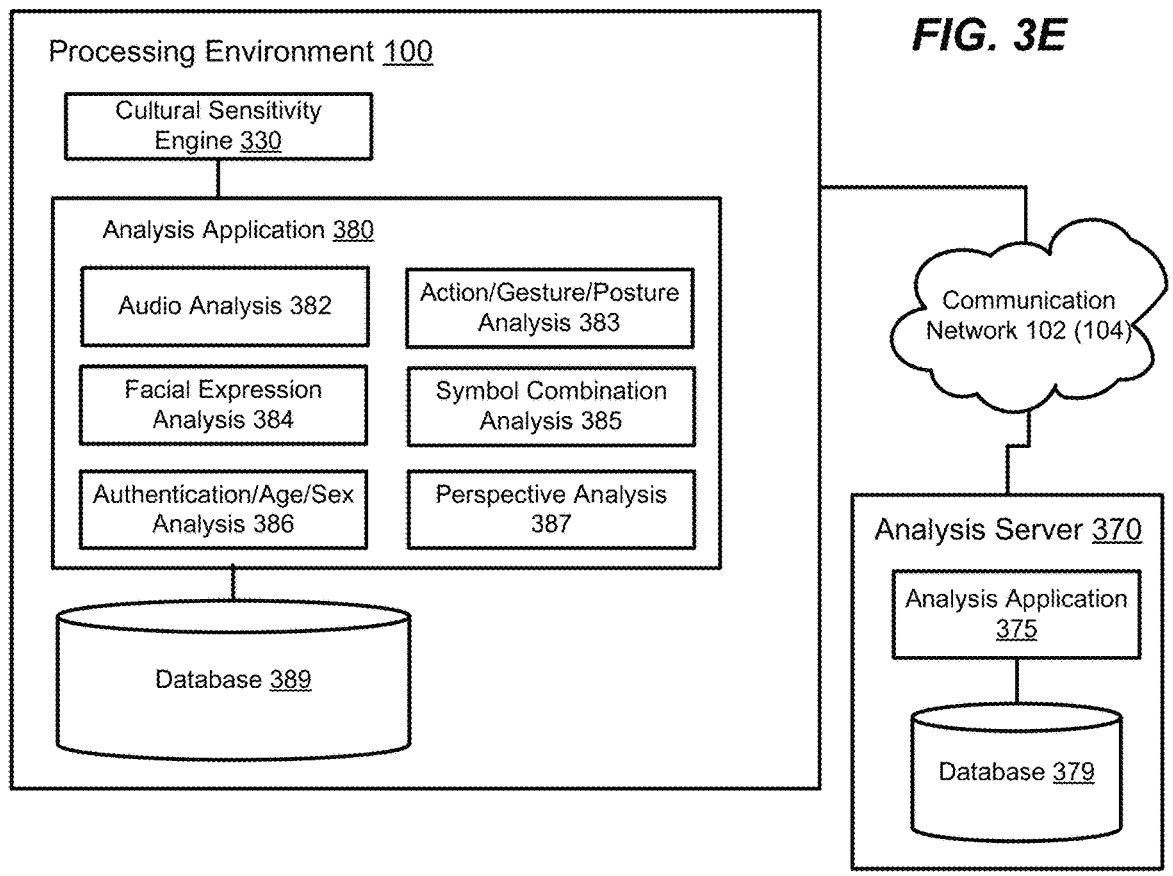
FIG. 3E is a block diagram illustrating aspects of functional components making up a processing environment and an application(s) for performing methods for flagging sensitive portions of a digital dataset for media production as described herein.

Referring to FIG. 3E, further examples of a method or methods for flagging sensitive portions of a digital dataset for media production, as may be performed by the processing environment 100 or other computing apparatus described herein, are described. In an aspect, an analysis application 380 analyzes the sensitive portions of the dataset 340 identified by the content classification/cultural sensitivity assessment engine 330 to determine a set of sensitivity assessment measures for the identified ones of the sensitive portions, or operates in parallel to the clearance engine 330 to provide additional information from the same text, audio, image, and/or reference information sources. By way of example, the application 380 includes an audio analysis component 382, facial expression analysis component 384, an age/sex analysis component 386, an action/gesture/posture analysis component 383, a symbol combination analysis component 385, and a perspective analysis component 387. Each of the modules or components of the analysis application 380, including the audio analysis 382, the facial expression analysis 384, the age/sex analysis 386, the action/gesture/posture analysis 383, the symbol combination analysis 385, and the perspective analysis 387 cooperate to provide an indication of context- or culturally-sensitive factors for potential sensitive portions present in the digital dataset 340 that is being analyzed. Each of the analysis components matches recognized inputs (text, image or audible) detected by the corresponding detection/recognition modules 331, 332, 333, 334, 335, 336, and 337 to an interpretation of that input relative to a database of electronic records 389. Each of the individual components 382, 384, 386, 383, 385, and 387 isolates and recognizes a 'handling' of a prop, e.g., behavior or condition of an actor interacting with a prop (e.g., objects, expressions, brands, and likenesses), which can be compared to classified portions of a prior media production in database 389. As each interaction may have multiple recognized handling occurring simultaneously, the analysis application 380 weighs any combination of inputs and associated handling at a given time and derives a conclusion about a context (e.g., cultural context) of the handling of a prop to report feedback on the given inputs.

In some implementations, the analysis application 380 uses a machine learning algorithm to correlate a plurality of sensitivity tags for the input (e.g., identified ones of sensitive portions) received from one or more modules of the content classification/cultural sensitivity assessment engine 330 as discussed in detail below to one or more symbol combinations appearing in the digital dataset. Optionally, the machine learning algorithm may be configured to process context- or culturally-sensitive factors (data) in addition to the input from the clearance engine 330, which may improve accuracy. Context-sensitive factor may include, for example, a character speaking, number of characters in a scene, character singing, time code, scene location, dialogue, and so forth.

In some embodiments, flagging sensitive portions of a digital dataset for media production can include analysis of audible and image inputs. In some implementations, the audio analysis component 382 determines spoken lines and lyrics expressed in the vocal instances detected by the speech-to-text converter module 331. Audible inputs can include expression, speech and word analysis, word choice and syntactic framing of utterances, and speech pace, rhythm, and pitch contour all provide indications of an analyzed character's expressed or intended emotional state.

In some embodiments, the audio analysis component 382 may implement a process for emotion detection, which in some aspect may be relevant in determining the context- or culturally-sensitive factors for referents of symbol combinations appearing in the digital dataset. For example, the audio analysis component 382 may operate by sampling the vocal instances detected by the speech-to-text converter module 331 and breaking it into a continuous sequence of consecutive audio windows each less than one second, for example, 0.5 seconds. The audio analysis component 382 may normalize the volume of each audio window to utilize the full dynamic range of the chosen audio format (e.g., 16 kHz mono). Modeling the audio input as a combination of a linear filter (vocal tract) and excitation signal (vocal cords), the audio analysis component 382 may separate the resonance frequencies (formats) into linear resonances carrying phoneme information and non-linear features mappable to emotional states by linear predictive coding (LPC). Other useful separation processes may include, for example, Mel-frequency cepstral coefficients (MFCC), and perceptual linear prediction (PLP). In addition, the character's gestures, expressions, and body language all reflect emotional state.

The audio analysis component 382 may apply a deep neural network to derive a time-varying sequence of speech features (e.g., phoneme morphologies). The processor parameterizes the non-linear features by any useful model for representing an emotional state of the character/vocal instance. For inferring emotion from audio data, the processor may use a data-driven, machine learning process that produces an n-dimension emotion vector representing an emotional state, where 'n' is a number large enough to represent emotional states that affect facial expression during speech but not so large as to render the training process too specialized to the input. Manual coding of emotional states may provide another option, or generating the emotion vector from other data, for example, non-photographic biometric data collected during recording of the reference video. Any useful method may be used to derive emotion data time-correlated to the character speaking the lines in the reference video, if used.

In some implementations, the facial expression analysis component 384 determines six basic facial expressions such as joy, anger, sadness, and pleasure expressed in the facial expression of a face in the digital image detected by the facial recognition module 335, which in some aspect may be relevant in determining the context-sensitive factors for referents of symbol combinations appearing in the electronic dataset. For example, the facial recognition module 335 may obtain basic facial expression evaluation values corresponding to a happy face, a sad face, an angry face, a fearful face, a disgusted face, and a surprised face, and outputs them as facial expression evaluation values for the detected face in the digital image. The facial recognition module 335 is not limited to the six basic facial expressions such as joy, anger, sadness, and pleasure, but may also calculate other useful evaluation values.

Calculation of evaluation values of the six basic facial expressions such as joy, anger, sadness, and pleasure may be implemented by a known technique in the art. For example, a processor may calculate change amounts for a feature amount of each portion from the difference between a feature amount of predetermined portion group obtained from an expressionless image prepared in advance and a feature amount (e.g., a vertical distance between a corner of an eye and a corner of the mouth) of predetermined portion group obtained from an input image. The evaluation value (score) for each facial expression is calculated from the change amounts for the predetermined portion group. Alternatively, and as another non-limiting example, determining the facial expression of the detected face in the digital image has three stages: (a) face detection, (b) feature extraction and (c) facial expression recognition. The first phase of face detection may involve skin color detection using YCbCr color model, lighting compensation for getting uniformity on face and morphological operations for retaining the required face portion. The output of the first phase may be used for extracting facial features like eyes, nose, and mouth using AAM (Active Appearance Model) method. The third stage, automatic facial expression recognition, may involve simple Euclidean Distance method. In this method, the Euclidean distance between the feature points of the training images and that of the query image is compared. Based on minimum Euclidean distance, output image expression is decided. Alternatively, the proposed method may be further modified by using Artificial Neuro-Fuzzy Inference System (ANFIS) to give a better recognition rate compared to other known methods. For further example, a deep neural network may perform facial recognition and expression recognition after being trained on a training set.

In some embodiments, the authentication/age/sex analysis component 386 performs an authentication (detection) process for the face of the person (e.g., actors) detected from the received digital image, which in some aspect may be relevant in determining the context- or culturally-sensitive factors for referents of symbol combinations appearing in the digital dataset. In an authentication process, either or all of an individual authentication, age authentication, and sex authentication may be performed. Various techniques are known and may be applied to the present disclosure for individual authentication, for example, any useful method for facial recognition as described in connection with facial recognition module 335.

For age authentication, a training set of average faces of the respective age groups may be prepared in advance. Matching may be performed by the facial recognition module 208 between the average face of each age group with the face of the person detected from the received digital image. Using estimation, the age group exhibiting the highest similarity is determined to be the age group to which the face of the person detected from the digital image belongs. In an aspect, average faces of the respective age groups may be generated based on a large quantity of acquired normalized images of the respective age groups (e.g., 0 to 10 years, 10 to 20 years, and 20 to 30 years).

In one or more embodiments, for sex authentication, sex-specific average faces are prepared in advance, and matching is performed by the authentication/age/sex analysis component 386 between the sex-specific average faces and the face of the person detected by the facial recognition module 335. Using estimation, the sex exhibiting the highest similarity is determined to be the sex corresponding to the face of the person detected from the received digital image. Sex-specific average faces may be generated based on a large quantity of acquired normalized images of the respective sex groups.

In some embodiments, the action/gesture/posture analysis component 383 may determine the context or manner of handling a prop (e.g., object, brand, or likeness) or behavior by an actor, in association with the action/gesture/posture of the actor appearing in the digital dataset and detected by a behavior recognition module 335. For example, in some embodiments, the action of a famous professional basketball player detected in the received digital image that is violently dunking a basketball may clear violence censorship in any given territory, but not if the basketball player is violently throwing a basketball into an opponent's face. Similarly, an offensive gesture by the basketball player while playing basketball, may not clear the profanity category or other censorship categories.

In some embodiments, the symbol combination analysis component 385 may use one or more automated learning (e.g., machine or meta learning) methods known in the art to assess the measurements on the different target features extracted by the object recognition module 334, the text/symbol recognition module 336, or the logo detection module 337, using one or more text/symbol/logo/string matching recognition algorithms. Examples of the learning algorithms that may be used as the symbol combination recognition algorithm include, but are not limited to: 1-NN, 3-NN, 10-NN, Decision tree/C4.5, Decision Rules/PART, Kernal Density, KStan, Linear Regression, LWR, Voted Perceptrons, SVM1, SVM2, SVM3, VFI, M5Prime, Naïve Bayes, AidaBoost M1/C4.5, and AidaBoost M1/PART. A given algorithm used by the mood analysis component 560 may indicate the discerned emotion (e.g., calm, happy, etc.) and various internal parameters. The mood analysis component 560 may thus execute different emotion recognition algorithms and produce their respective results and internal parameters.

In some embodiments, the perspective analysis component 387 receives digital image decoded by the decoder 339, which it generates from a dataset 340 received or otherwise accessed by the content classification engine 330. In some implementations, the object recognition module 334 or facial/behavior recognition module 335 detects a focus of a scene, for example, by detecting a camera angle or a point of view used to shoot a person or object appearing in the received digital image. The perspective detection (detection of focus of a scene, e.g., via camera angle or point of view) can be performed by using a predetermined algorithm. For example, an algorithm used by the object recognition module 334 or the facial detection module 335 or the like may be used by the perspective analysis component 387. For example, the perspective analysis component 387 may apply photogrammetric relationships with object detection to classify the camera angle relative to actors or other objects appearing in the frame. In an aspect, symbolic indications of detected perspective may be used in a process that automatically generates annotations indicating the classification of camera angle or focus of a scene for use in media production sensitivity assessment.

The analysis server 370 may include an analysis application 375, which includes one or more analysis applications similar or identical to the analysis components 382, 383, 384, 385, 386, and 387. The analysis server 370 may also include a database 379, which may be similar or different to the database 389. The functionalities of the analysis application 380 in the present method for flagging sensitive portions of a digital dataset for media production as described herein may be augmented or supplanted by the analysis server 370.

Figure 4A:
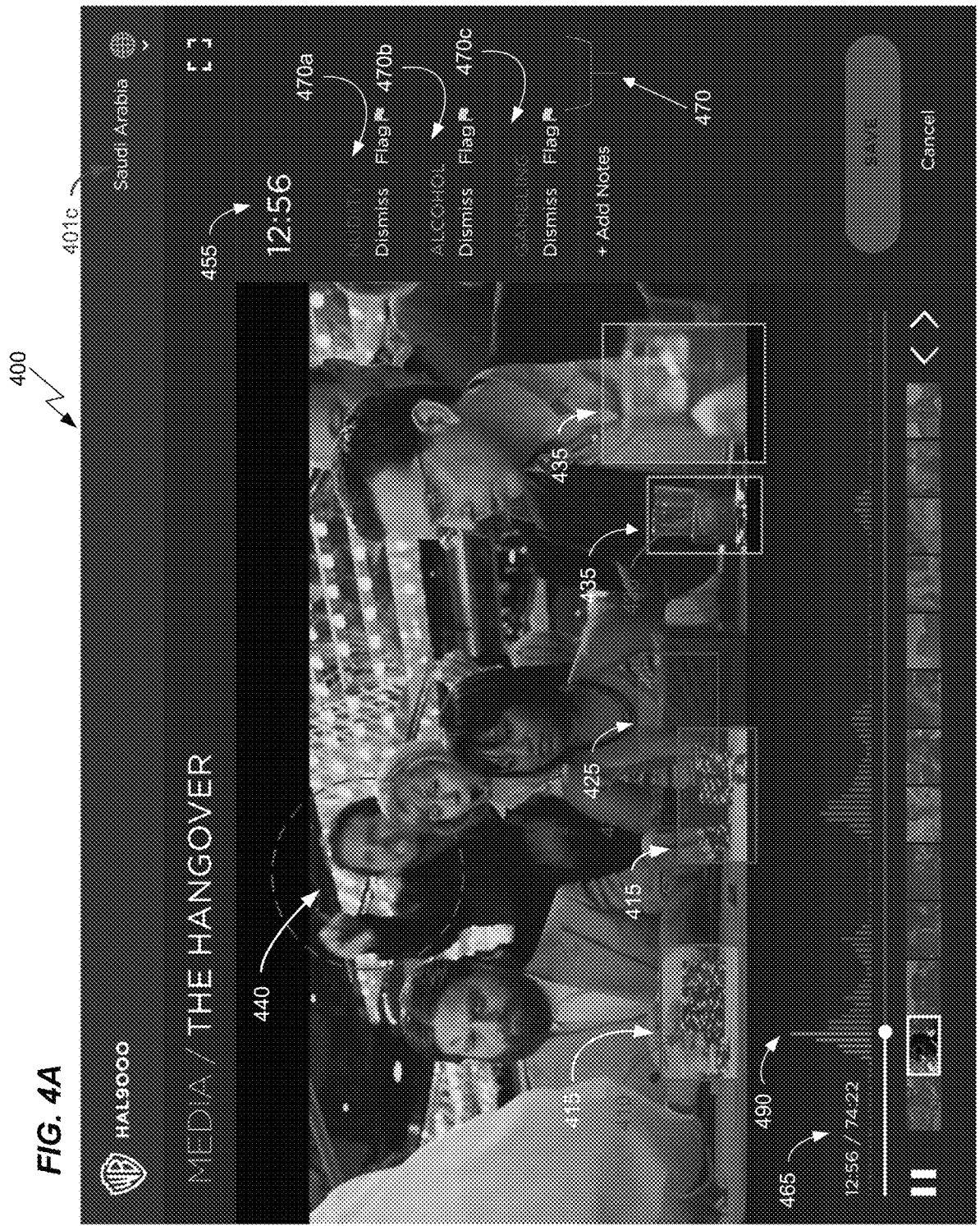
FIG. 4A is a graphic rendering of an example display of a digital dataset for media production with indications of a plurality of sensitivity tags for a frame of an audio-video data that are generated based in part on the one of the plurality of distribution profiles (e.g., Saudi Arabia in this example).

Referring to FIG. 4A, a graphic rendering (e.g., screenshot) of an example display 400 of a digital dataset for media production is shown, with indications of a plurality of sensitivity tags for a frame of an audio-video data that are generated based in part on the one of the plurality of distribution profiles. The graphic renderings shown in FIGS. 4A-D may be generated by an application executed by or for a user-facing computing device, for example, a terminal 101 or client 300. In this example, the distribution profile is 'Saudi Arabia' (401c). In 'Saudi Arabia,' nudity 470a, alcohol 470b, gambling 470c are sensitive topics (types of sensitive events 470) that may be correlated to one or more content control rules governing media distribution. Each of the types of sensitive events 470 (470a-470c, and also 470d not shown in FIG. 4A but shown in FIGS. 4C-4D) may be represented by a different visual scheme such as color, font type, font size, etc., and such visual scheme may correspond with the respective sensitivity tags (e.g., heat maps 415, 425, 435, 445, etc., or bar graph 490). For instance, nudity 470a is shown in red color, and heat map 420 is also shown in red. Alcohol 470b is shown in orange, and heat map 435 as well as bar graph 490 is also shown in orange. Gambling 470c is shown in purple, and heat map 415 is also shown in purple. Heat map 415 is an example of a sensitivity tag that highlights a sensitive portion, i.e., an imagery of casino chips 410 appearing in the scene 455 defined by a time code 465, "12:56/74:22," which may be subject to censorship as being correlated to gambling 470c. Heat map 425 is another heat map highlighting an imagery of a female exposing her chest 420 in the same scene, which may be correlated to nudity 470a. Heat map 435 is another heat map highlighting a glass(es) containing a drink(s), which may be correlated to alcohol 470b. Other distribution profiles may also be useful.

A bar graph 490 represents a quantitative level of sensitivity of each sensitive event in the scene 455, which may be calculated by the AI sensitivity assessment engine using a benchmark for the region of interest. The processor may assign a different benchmark to each region, depending on relative sensitivity of the region. Thus, the same content may result in a different level of sensitivity depending on region, which can be seen by comparing the levels 490 across FIGS. 4A-D.

Figure 4B:
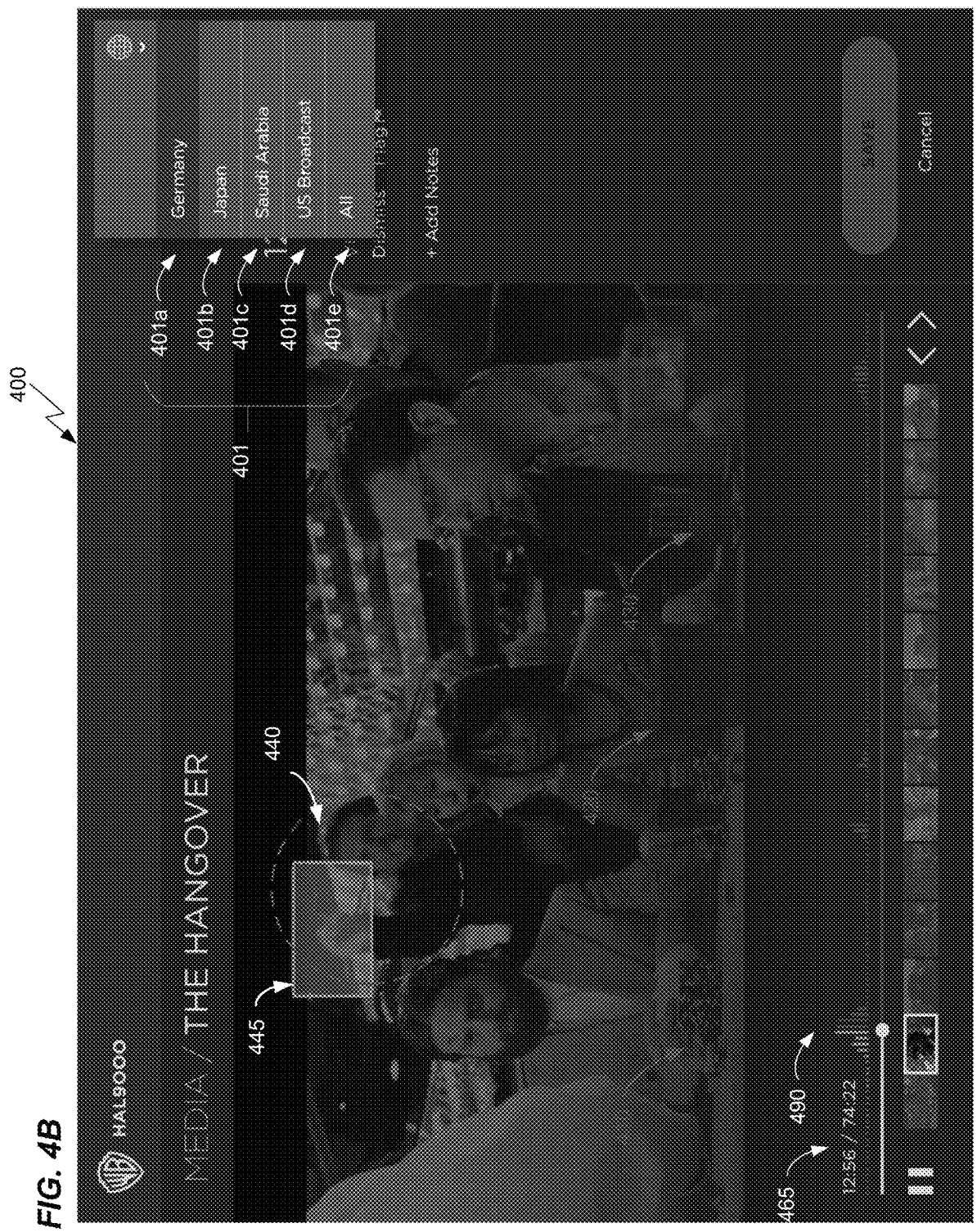
FIG. 4B is a graphic rendering of the display in FIG. 4A, including a menu for toggling at least two of a plurality of sets of one or more sensitivity tags based on a plurality of distribution profiles.

FIG. 4B is a graphic rendering of the display 400 in FIG. 4A, including a menu 401 for toggling at least two of a plurality of sets of one or more sensitivity tags based on a plurality of distribution profiles 401, such as 'Germany,' 'Japan,' 'Saudi Arabia,' 'US Broadcast,' and 'All' (401a-401e, respectively). Here, compared to the display in FIG. 4A having the distribution profile of 'Saudi Arabia' (401c), the distribution profile is instead toggled to 'Germany' (401a), as will be made more apparent with reference to FIG. 4C below.

Figure 4C:
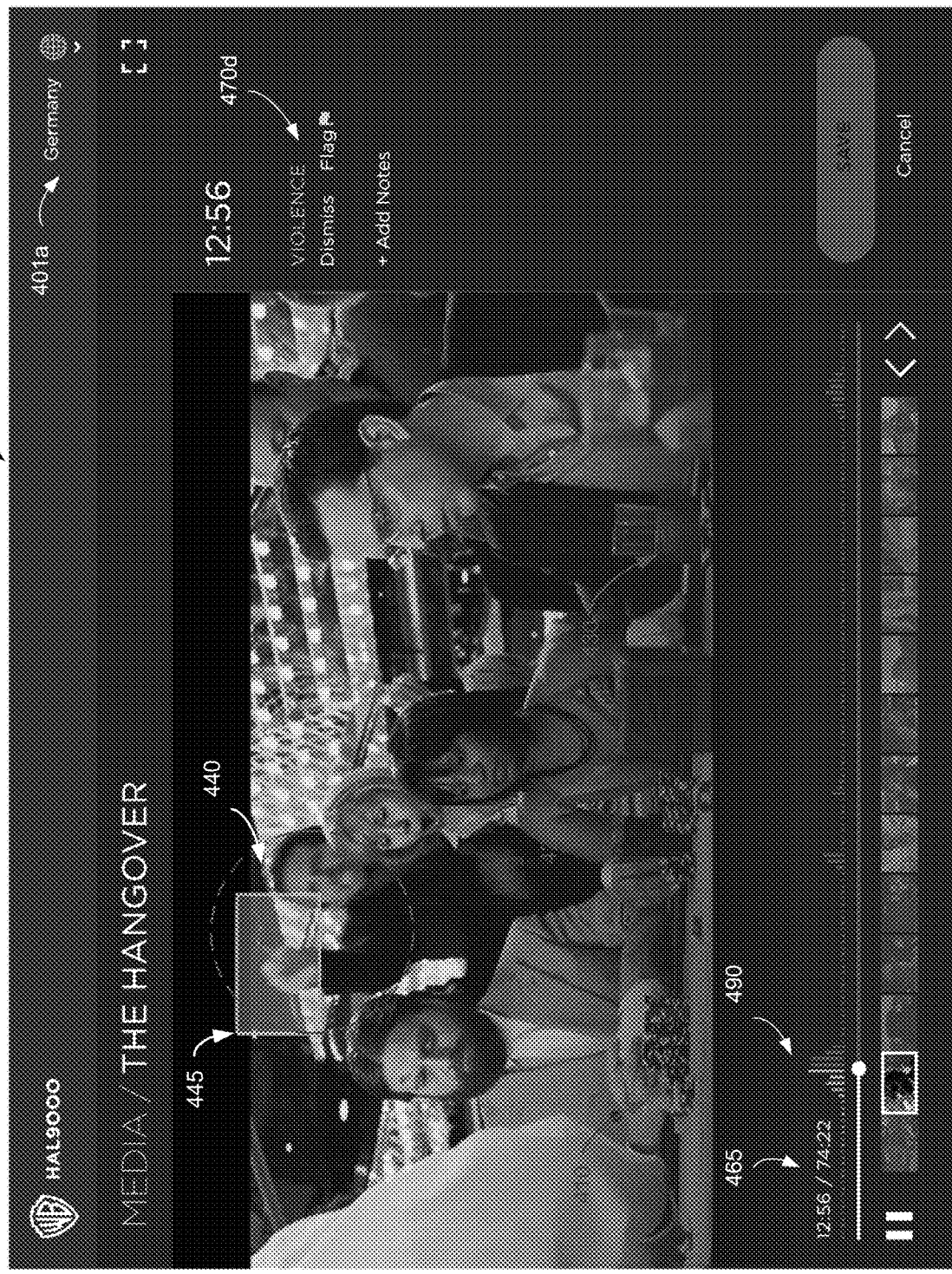
FIG. 4C is a graphic rendering of another example display of the digital dataset with indications of a plurality of sensitivity tags for the same frame as in FIG. 4A, the sensitivity tags being generated based in part on another one of the plurality of distribution profiles (e.g., Germany in this example).

FIG. 4C is a graphic rendering of another example display 400 of the digital dataset with indications of a plurality of sensitivity tags for the same frame 455 as in FIG. 4A, the sensitivity tags being generated based in part on another one of the plurality of distribution profiles. Here, the distribution profile is 'Germany' (401a) as in FIG. 4B, except the toggle menu 401 in FIG. 4B is now removed from view. In contrast to 'Saudi Arabia' in FIG. 4A, under 'Germany,' only violence 470d may be subject to censorship. Heat map 445 highlights an imagery of a man exhibiting a violent behavior or expression 440. Otherwise, the heat maps 415, 425, and 435 previously appearing in FIG. 4A are no longer shown. Also, the bar graph 490 now shows a different level of level of sensitivity of each sensitive event in the scene 455, as well as a different visual scheme (i.e., green), which matches the visual/color scheme of violence 470d.

Figure 4D:
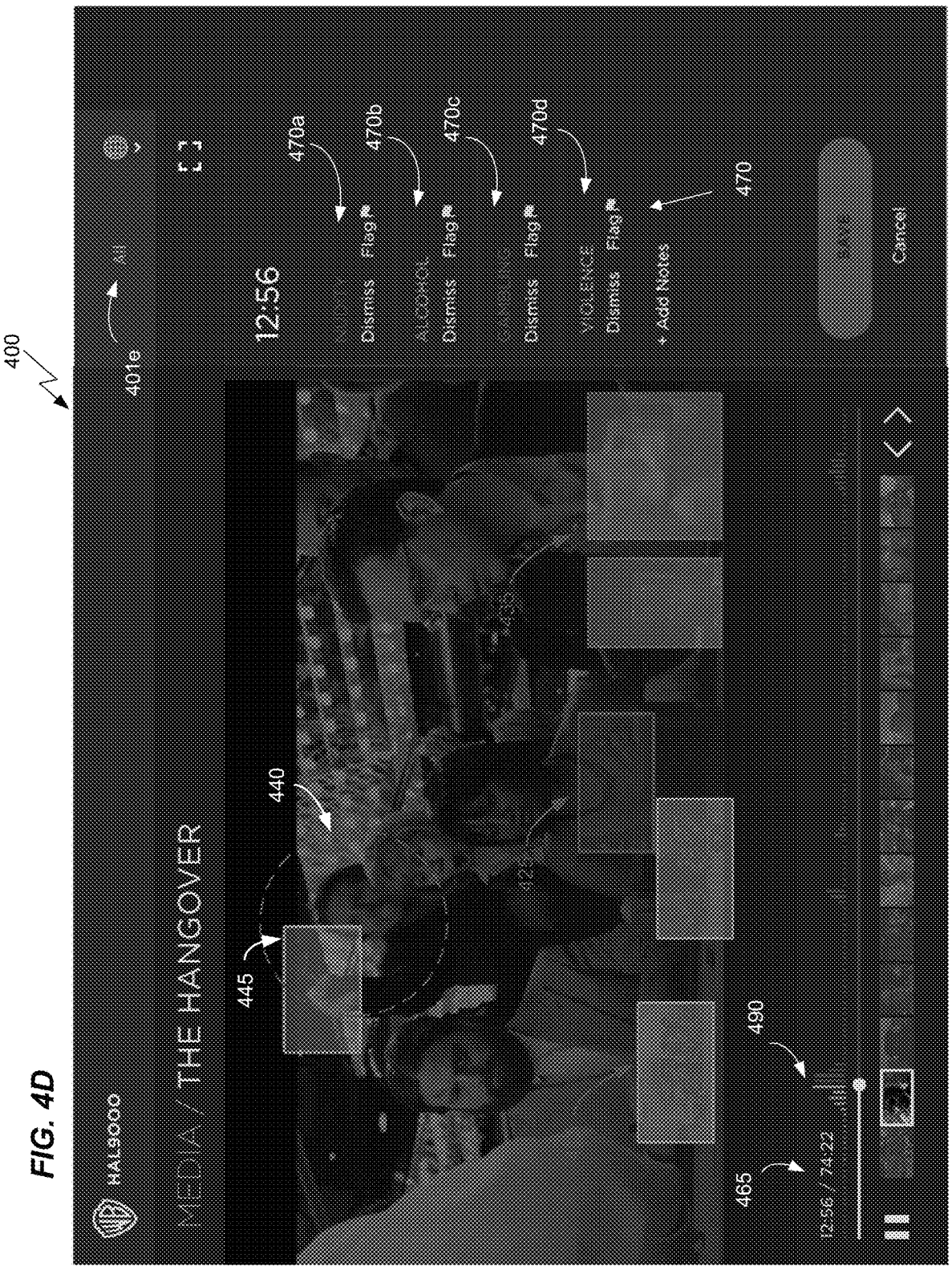
FIG. 4D is a graphic rendering of another example display of the digital dataset with indications of a plurality of sensitivity tags for the same frame as in FIG. 4A, the sensitivity tags being generated based in part on all of the plurality of distribution profiles.

FIG. 4D is a graphic rendering of another example display 400 of the digital dataset with indications of a plurality of sensitivity tags for the same frame as in FIG. 4A, the sensitivity tags being generated based in part on all of the plurality of distribution profiles. In this example, all of the distribution profiles are selected ('All'; 401e).

Figure 5A:
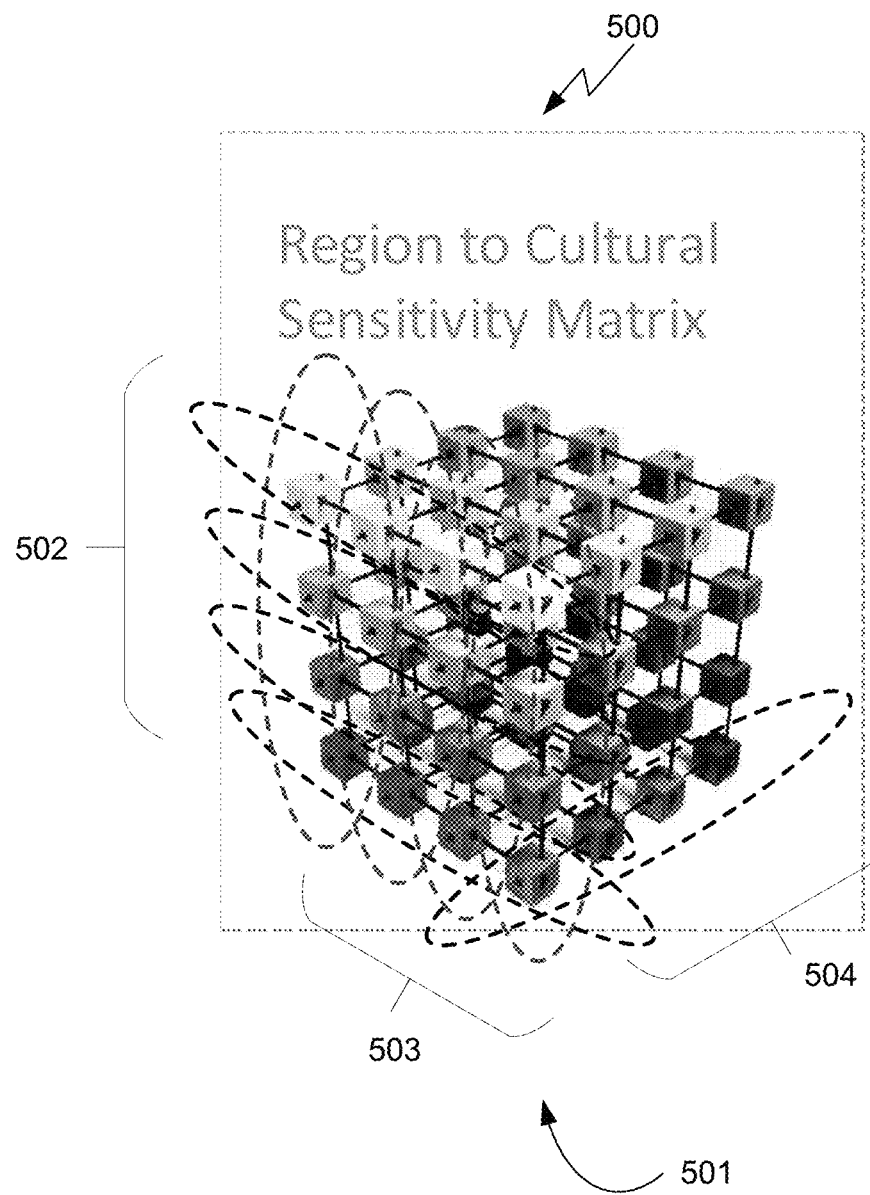
FIG. 5A is a conceptual diagram illustrating a multidimensional tensor for saving the distinct pluralities of the sensitivity tags.

FIG. 5A is a conceptual diagram illustrating a multidimensional tensor 500 for saving the distinct pluralities of the sensitivity tags. Each component (represented by a box) in the tensor represents sensitivity tag value(s). For example, the multidimensional tensor may include a data table 501 with rows 502 of sensitivity tag values one for each sensitivity (content classification 470; FIG. 4D) category (e.g., 'Nudity' 470a, 'Alcohol' 470b, 'Gambling' 470c, and 'Violence' 470d, etc.; FIG. 4D) and columns 503 of distribution profiles 401 (e.g., country profiles 'Germany' 401a, 'Japan' 401b, 'Saudi Arabia' 401c, 'US Broadcast' 401d, 'All' 401e, etc.; FIG. 4B illustrates use of a single profile, for which a two-dimensional tensor is adequate. The multidimensional tensor 500 may be expanded to three or more dimensions by any other factor that might influence sensitivity values. For example, in an aspect, the multidimensional tensor 500 as shown in FIG. 5A is a three-dimensional tensor, having three dimensional components including sensitivity tag categories 502, country profiles 503, and levels of sensitivity 504.

Figure 5B:
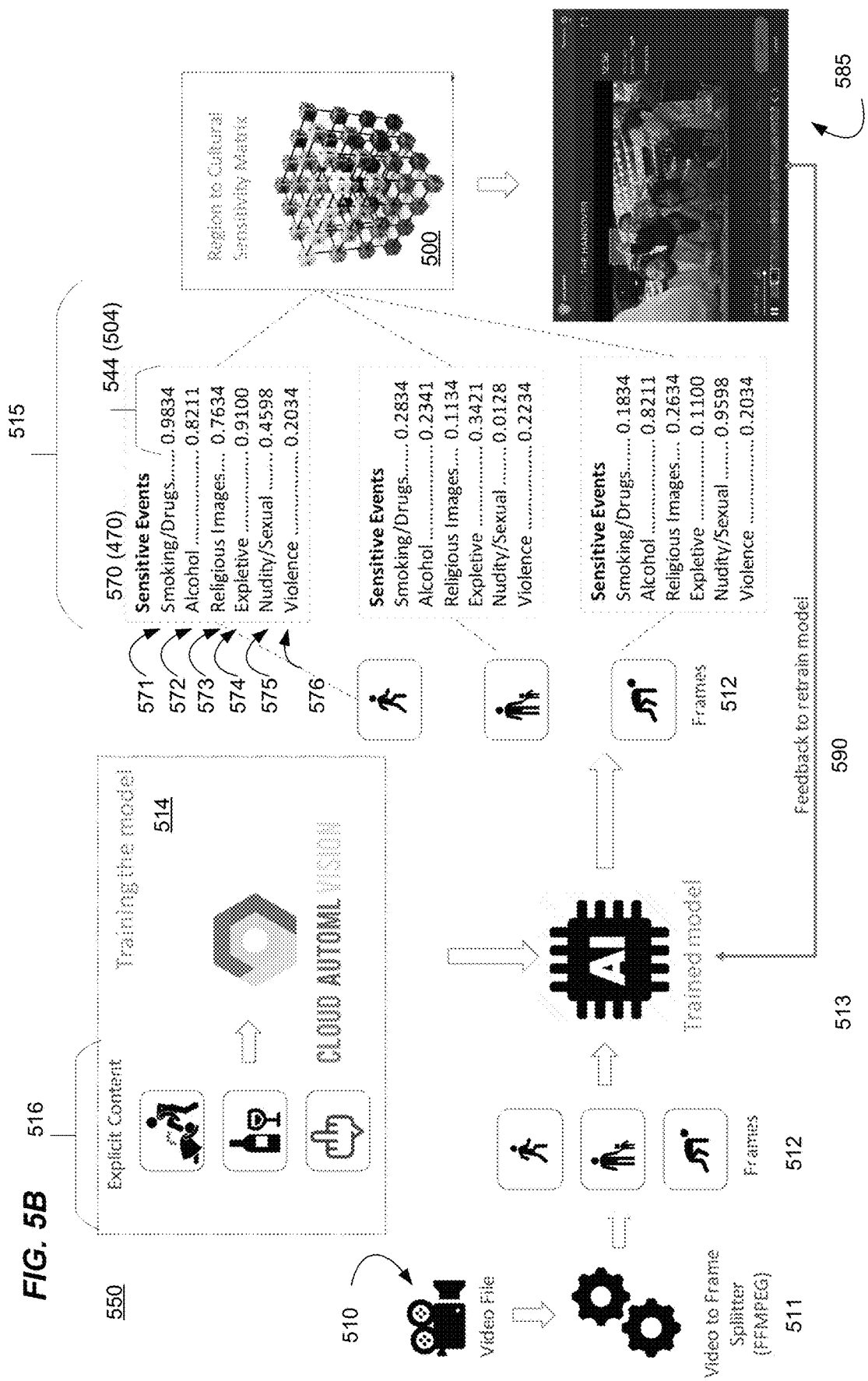
FIG. 5B is a conceptual diagram illustrating high-level aspects of a method for flagging sensitive portions of a digital dataset for media production.

FIG. 5B is a conceptual diagram illustrating high-level aspects of a method for flagging sensitive portions of a digital dataset 510 for media production 550. In an aspect, a video source file 510 is processed by a video-to-frame splitter tool 511 (e.g., FFmpeg) running on a processor of the present disclosure to break the content down into individual frames 512. Each frame 512 is then run through a machine learning model 513 that has been built using a predictive machine learning model (e.g., Tensorflow, GCP, etc.) which is pretrained 514 to annotate any frame 512 with additional metadata 515 specifically as it pertains to censorship (or other distribution requirement) 516. Forms of censorship 516 that the machine learning model 513 may typically detect and identify include smoking/drugs 571, alcohol 572 (470b; FIG. 4D), religion 573, obscenity/expletive 574, sexuality/nudity 575 (470a; FIG. 4D), violence 576 (470d; FIG. 4D), gambling 577 (470c; FIG. 4D), protests 578, war 579, freedom of expression 580, and so forth. This information (sensitive events) 570 is provided to a sensitivity assessment program 513 that attempts to map, for example, using a multidimensional tensor 500, any relevant object/expression 516 that falls under the category of censorship 570 to a sensitivity score 544 (504; FIG. 5A) defined based on distribution profiles 401 (country or region). All relevant sensitivity tags are assigned a score 544 (504; FIG. 5A) based on the distribution profiles 401, which is used to indicate, on a heat map (e.g., 415, 425, 435, 445, etc.; FIGS. 4A-4D) how strong the likelihood is for that object/expression 516 to be censored in said region 401. User feedback 585 on whether the score 544 (504) predicted by the algorithm 513 (low/medium/high) is accurate is fed back 590 into the machine learning model 513 which is then used to iteratively improve the model 513 over time.

Having described examples of suitable clients, servers, and networks for performing the methods for media production sensitivity assessment, more detailed aspects of these methods will be addressed. The apparatuses 200 and 300 may each perform the methods, alone, or working in cooperation.

FIG. 6 illustrates an overview of the methods 600 for flagging sensitive portions of a digital dataset for media production, which may include related operations in any functional order or in parallel that may be performed by one or more processors (e.g., 202, 214, 302, 310). References will also be made to (elements appearing in) preceding FIGS. 1-5 and to elements referenced in the subsequent FIG. 7 in discussing FIG. 6.

A sensitive portion flagging method may be triggered at process 610, when a user, e.g., media production staff, initiates an automatic assessment process for sensitive portions of a media production material. As used herein, "production staff" or "media production staff" includes a user (e.g., users of sensitive portion flagging system or apparatus), such as production staff including production leadership such as directors, producers, assistant directors, localization staff including territorial representatives, and other members of the production departments such as the legal clearance department, costume department, set (art) department, props (art) department, hair/makeup department, sound department, camera and electrical department, script department, etc.) interacting with the environment 100 via software or hardware or both using a computer device 101.

At the process 620, one or more processors receive or otherwise access a digital dataset 340 for media production, the dataset including at least one of audio data, video data, or audio-video data for producing at least one media program. The processor(s) may access one or more databases (e.g., any one or more of 116, 122, 124, 126, 128, 220, 379, 389, etc.) including electronic records, where each record may be correlated to one or more classified sensitive portions from one or more prior media productions. In addition, or in an alternative, the one or more processors may determine where the media content is intended to be distributed based on a metadata indicator, and in a downstream process evaluate sensitivity level based in part on the intended geographic distribution. In some aspect, the one or more processors at an analysis server, a device 101, or any other suitable node within the environment 100 may maintain one or more databases of electronic records (e.g., 379, 389; FIG. 3E) relevant to a digital dataset for media production. The electronic records may be formed and maintained in a data structure of any useful type, for example as described herein above in relation to FIGS. 3D and 5A. In an aspect, the electronic dataset may include post production audio-video source file for producing a media program, for example a movie, an episode of a serial drama, a documentary, an infomercial, a video game, an advertisement, a talk show or social game, or other programs, animated or not. In an aspect, a processor may generate 'heat maps' as visual aids to show where certain issues and/or intended distribution territories may be of special concern, i.e., register high on the sensitivity assessment scale.

At the process 630, the method may include the processor identifying sensitive portions of the digital dataset likely to be in one or more defined content classifications, based at least in part on comparing unclassified portions of the digital dataset with classified portions of the prior media production using an algorithm. For example, the comparing may be done by training a machine-learning algorithm using the prior media production with the classified portions, and then processing the digital dataset using the trained algorithm. In an aspect, the sensitive portions include, for example, images types or phrases, including, but not limited to, objects/expressions that may be subject to censorship, such as casino chips, a glass containing an alcoholic drink, a man physically/verbally attacking another individual, nudity, and so forth, but may also include: text in an image to flag for localization, products within an image to flag for ad sales and Clips & Stills Licensing, scene changes, frame composition to auto generate thumbnails for OTT platforms, credits from end reel to enhance talent information, etc. In an aspect, the identification of the sensitive portions, e.g., detection and comparison of potential sensitive portions with classified portions from prior media productions, is based on the electronic dataset (sensor data) 720, the training set 710, database of prior media productions 750, or a set of neural state indicators 740 (FIG. 7). In another aspect, the identification of sensitive portions include predicting a level of sensitivity (e.g., culturally sensitive contents subject to censorship in certain territories, and other sensitivity associated with media production), which may include a quantitative estimate in comparison to a benchmark and a classification of a type of sensitivity (e.g., nudity, gambling, alcohol, violence). For example, in an aspect, a machine learning component or algorithm may be used to predict the level of sensitivity, where the machine-learning component is trained to recognize similarity based at least in part on comparing unclassified portions of the digital dataset with classified portions of the prior media production, by first training the algorithm using the prior classified portions, and then processing the digital data using the trained algorithm.

At the process 640, the processor generates a plurality of sensitivity tags each signifying a sensitivity assessment for a corresponding one of the sensitive portions.

The one or more processors at process 640 may use a content classification algorithm 730, which may be a machine learning algorithm such as a predictive analytics (AI) algorithm, or a rule-based algorithm, or a combination of both, to assess sensitivity for media production. The predictive analytics algorithms may include at least one supervised machine learning (SML) algorithm, for example, one or more of a linear regression algorithm, a neural network algorithm, a support vector algorithm, a naïve Bayes algorithm, a linear classification module or a random forest algorithm. Further details of the structure and operations of the content classification algorithm 730 will be discussed below with reference to FIGS. 7-14.

Referring to FIG. 7, machine learning, including predictive analytics algorithms, and sometimes referred to as artificial intelligence (AI), can be an efficient tool for uncovering correlations between complex phenomena. As shown in FIG. 6, a system 600 for flagging sensitive portions of a digital dataset for media production based on digital dataset 340, sensor data 720, training set 710, neural state indicators 740 (and database of prior media production 750, may use a content classification algorithm 730, e.g., a machine learning algorithm using artificial intelligence (AI) to assess media production sensitivity. The content classification algorithm 730 may receive or otherwise access the electronic dataset 340 (FIG. 3C), which may include the sensor data 720 from one or more sensors 328, and the training set 710 may be received or retrieved from one or more of the servers 116, 122, 124, 126, 128, 220, 379, 389, and the like. In some aspect of the present disclosure, the sources of the dataset 340 or the sensor data 720 may include another server, or from an application (or "app"), or from a third-party server. For example, the source may be a server or an application from a media production company or a member of the production or localization staff.

For example, in one aspect, the electronic dataset may be received or accessed by the processor from devices 101 or from one or more of the servers 116, 122, 124, 126, 128, 220, 379, 389, and the like. For example, the electronic dataset may be a post-production audio-video source file for a media program, which may contain text/audio/image data.

It should be noted that instead of or in conjunction with the sensor data 720, any part or combinations of one or more of the data sets (e.g., 341, 342, 343; FIG. 3C) in the digital dataset 340, sensitivity tags in the database 350, and training set 710 may be used, and instead of or in conjunction with the neural state indicators 740, other sensory data detected by sensors 328, or data input by a user via U/I 324 or 314 and the like may be used.

The potential sensitive portions or events and defined sensitive portions or events may be collected and flagged by the processor for subsequent review by a human, e.g., a production or localization staff, who may check the level of sensitivity manually and review for misclassified portions or missed portions (i.e., portions that should be flagged but are not). In an alternative, the level of sensitivity can be checked by human and semi-automatic processing without being classed with similar components. These human-scored and/or machine-scored elements become training data 710 for the predictive analytics process 730. In some embodiments, humans scoring aspects of the sensitive portions and the level of sensitivity may include one or more of the users, such as via online survey forms or electronic voting using one or more devices that are connected as part of the environment 100. The screenshots shown in FIGS. 4A-D illustrate examples of a user interface for human review.

The machine learning process 730 may compare human and/or machine-determined sensitivity assessments and may use iterative machine learning methods as known in the art to reduce error between the training data and its own estimates.

Figure 8:
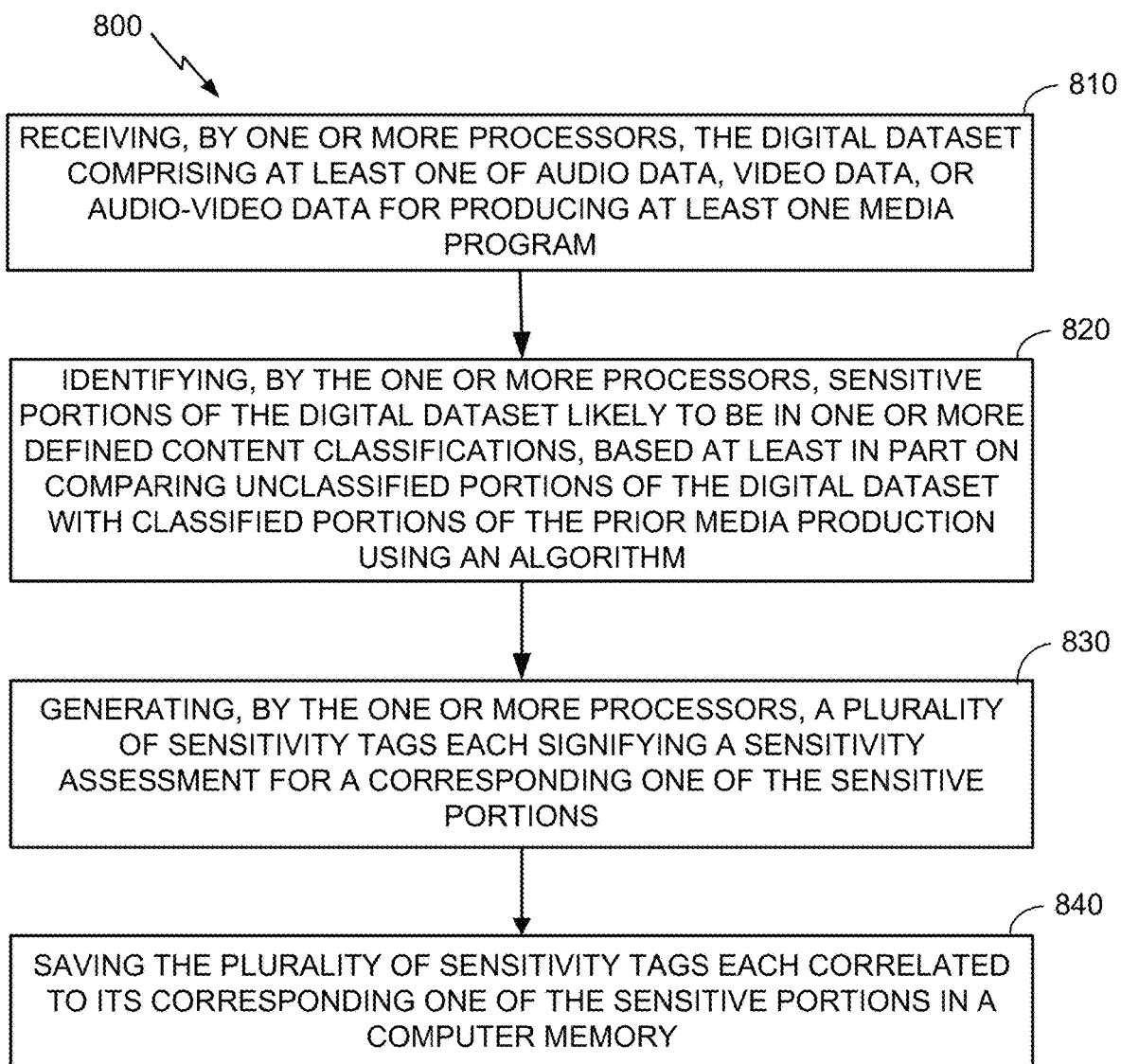
FIG. 8 is a flow chart illustrating aspects of a method for flagging sensitive portions of a digital dataset for media production.

In accordance with the foregoing, FIG. 8 is a flow chart illustrating aspects of a useful automatic method 800 for flagging sensitive portions of a digital dataset for media production, and FIGS. 9-14 are flow charts illustrating further optional aspects or operations of the method diagrammed in FIG. 8. In an aspect of the disclosure, the method 800 may be performed by one or more processors at a sensitivity assessment server or other servers, and devices described herein, and may include other details described elsewhere herein.

At 810, a processor receives or otherwise accesses a digital dataset comprising at least one of audio data, video data, or audio-video data for producing at least one media program. In an aspect, the processor will identify sensitive portions based on current sensitivity information in addition to legacy or prior information used for training a machine learning component. For example, in one aspect, receiving or otherwise accessing the dataset may include receiving data (e.g., a post production audio-video source file) from a computer communicably connected to the content classification/cultural sensitivity assessment engine or server.

At 820, the processor identifies sensitive portions of the digital dataset likely to be in one or more defined content classifications, based at least in part on comparing unclassified portions of the digital dataset with classified portions of the prior media production using an algorithm, for example by processing the digital dataset using a machine-learning algorithm trained on the prior classification data. In an aspect, the identifying may include selecting or assembling the database of electronic records. For example, the prior media productions may include a corpus of actually produced audio video work of, for example entertainment, instructional information, video gaming, advertisement, and social networking, such has movies or episodic shows, which may or may not have direct serial relationship with the media production at hand. For further example, a prior media production may be a prior episode of an episodic show or a movie series, and the media production at hand may be a sequel thereto. In another example, the prior media production may include appearance of the same or similar actor(s) and/or same or similar sensitive portions such as expressions or props (e.g., objects, brands, likenesses), text (e.g., logos), and audio (e.g., songs and music). In an aspect, at least one of the identifying or comparing may include use of a predictive algorithm. For example, the method 800 may further include, by one or more processors predicting similarity between the one or more unclassified portions of the digital dataset with classified portions of the prior media production using a predictive algorithm, for example, a machine-learning algorithm based on a deep neural network trained to single out expressions, props, brands, or likenesses using comparable prior production data including already classified portions of the same type as needed for the digital dataset. Such an algorithm may include, for example a trained machine learning process or a rules-based algorithm that that weights and compares potential sensitivity elements to electronic dataset identifiers such as semantic tags and metadata in defined sensitivity elements. Further aspects of machine learning implementation of the recited "comparing" are described herein above, for example in connection with FIGS. 3B-7.

At 830, the processor generates a plurality of sensitivity tags each signifying a sensitivity assessment for a corresponding one of the sensitive portions. In an aspect, the determination of a sensitivity assessment including a level of sensitivity may include use of a predictive machine-learning algorithm. For example, the method 800 may further include, by one or more processors predicting the level of sensitivity using a machine-learning algorithm based on a deep neural network trained on one or more classified portions from a prior media production and one or more unclassified portions present in, or one or more symbol combinations appearing in, the digital dataset. Such an algorithm may include, for example a trained machine learning process or a rules-based algorithm that weights and compares electronic dataset identifiers such as semantic tags and metadata in defined sensitivity elements and potential sensitivity elements. In an alternative, or in addition, generating the sensitivity tags may include use of a rule-based algorithm to sort and classify the sensitive portions using a system of prioritized rules.

At 850, the processor saves the plurality of sensitivity tags in a computer memory, such as a memory module within a client device or a server, or a storage in any of the foregoing.

FIGS. 9-11 show additional operations 900-1430 that may optionally be included in the method 800 and performed by one or more processors performing the method 800, in any operative order. Any one or more of the additional operations 900-1430 may be omitted unless needed by a downstream operation and one or more of the operations 900-1430 may replace one or more others of the operations of the method 800. Any useful combination of operations selected from the group consisting of the operations 900-1430 may be performed by one or more processors of an apparatus as described herein as an independent method distinct from other useful combinations selected from the same group.

Referring to FIG. 9, at 910, the one or more processors may relate the plurality of sensitivity tags to one of a plurality of distribution profiles. For example, the distribution profile may include a censorship profile for a specific country or region.

At 920, the one or more processors may assign a sensitivity score to each of the sensitivity tags based on the one of the plurality of distribution profiles. For example, the sensitivity score may be selected from low/medium/high, or the score may be a percentage or a numerical value from a predefined scale (numerical range).

At 930, the one or more processors perform the generating, wherein generating the plurality of sensitivity tags is based in part on the one of the plurality of distribution profiles, wherein each of the distribution profiles identifies a set of sensitive topics each correlated to one or more content control rules. For example, a set of sensitive topics may include sensitive events or expressions such as protests/riots, guns, violence, smoking, nudity, sex, alcohol, etc., which may be identified per scene and determined to be acceptable by one distribution territory (e.g., country or region) versus another.

At 940, the one or more processors perform the generating, wherein generating the plurality of sensitivity tags comprises assessing a sensitivity that each corresponding one of the sensitive portions does not comply with the one or more content control rules correlated thereto. For example, an expression of nudity does not comply with the content control rules in Saudi Arabia, whereas the same expression may comply with the content control rules in Germany.

At 950, the one or more processors generate the plurality of sensitivity tags, wherein the sensitivity assessment includes metadata for targeting localization or distribution of the electronic dataset. For example, the metadata for targeting localization or distribution may designate countries or regions. A localization region may refer to a large region (e.g., Middle East, LATAM) which includes multiple countries, and distribution profiles may correspond to countries or regions. For further example, a localization region having the same content rules applicable to its member countries (e.g., the Nordics); the FIGS (France, Italy, Germany, and Spain) may be another localization region having its contents rules applied to its member countries, the Middle East may be yet another localization region having its content rules applicable to its member countries; and so on and so forth.

Referring to FIG. 10, at 1010, the one or more processors perform the generating and the saving for distinct pluralities of the sensitivity tags each signifying a corresponding sensitivity assessment based on a different one of the plurality of distribution profiles. For example, the different ones of the plurality of distribution profiles may include Germany (401*e*), Japan (401*b*), Saudi Arabia (401*c*), US Broadcast (401*d*), and All (401*e*) as shown in FIG. 4B, or any other suitable distribution profiles corresponding to other countries or regions.

At 1020, the one or more processors save the distinct pluralities of the sensitivity tags as a multidimensional tensor. An example of the multidimensional tensor is illustrated and discussed with reference to FIG. 5A. In an aspect, the multidimensional tensor may include a data table with rows of sensitivity tag values one for each category and columns of distribution profiles (e.g., country profiles) one for each profile, e.g., a two-dimensional tensor. Alternatively, or in addition, the tensor may include three or more dimensions by any other factor that might influence sensitivity values, such as sensitivity tags, country profiles, and levels of sensitivity.

Referring to FIG. 11, at 1110, the one or more processors generate a display of the digital dataset with indications of the plurality of sensitivity tags. Examples of such display is illustrated in FIGS. 4A-4D (400). At 1120, the one or more processors provide additional content coordinated with the plurality of sensitivity tags, for example, add note to guide post production localization, e.g., suggest what to substitute to save the scene, e.g., swap alcohol for a can of Coke, cropping, panning, scanning, or other action to comply with the applicable requirement. In an alternative, or in addition, the one or more processors may instead of indicating that certain items (visuals or audio) ought not be included to mitigate censorship assessment may reduce sensitivity by implementing so-called 'diminished reality' technology and methods. A survey of many such diminished reality technologies is described in "*A Survey Of Diminished Reality: Techniques For Visually Concealing, Eliminating, And Seeing Through Real Objects*" by Shohei Mori, Sei Ikeda, and Hideo Saito. In this manner, not only would the system identify potential clearance sensitivity items or issues with sensitivity assessments; the system could also suggest some method(s) to resolve the issues, e.g. by removing the problematic item and showing the resulting content for quality assessment. In an aspect, the processor may perform diminished reality processing after principal photograph or other original image origination, during editing for example.

Referring to FIG. 12, at 1210, the one or more processors display the plurality of sensitivity tags for one or more frames of the video or audio-video data. Examples of the sensitivity tags (415, 425, 435, 445, 490) for a frame of a video are displayed in FIGS. 4A-4D.

At 1220, the one or more processors perform the method 800 wherein the displaying includes toggling at least two of the plurality of sets of one or more sensitivity tags based the plurality of distribution profiles. The examples of the plurality of distribution profiles (401a-401e) are shown, for instance, in FIG. 4B, and the toggling is shown, for example, between FIG. 4A (Saudi Arabia: 401), FIG. 4C (Germany: 401a), and FIG. 4D (All: 401e). At 1230, the one or more processors perform the method 800 wherein each of the plurality of distribution profiles is specific to a localization region. For example, the distribution profiles 401a, 401b, 401c, and 401d (FIG. 4B) are specific to Germany, Japan, Saudi Arabia, and US (Broadcast), respectively. Of course, those skilled in the art would appreciate that other distribution profiles for other countries or regions may be possible.

Referring to FIG. 13, at 1310, the one or more processors perform the method 800 wherein the identifying further comprises using one or more machine learning components trained to recognize similarity between the one or more sensitive portions and the classified portions of the prior media production. At 1320, the one or more processors perform the method 800 wherein the identifying further comprises predicting a level of sensitivity of the one or more sensitive events using the one or more machine learning components. For example, the method 800 may include using a predictive algorithm, for example, a machine-learning algorithm based on a deep neural network trained to single out sensitive events such as expressions, props, brands, or likenesses, or to predict the level of sensitivity of the sensitive events. Such an algorithm may include, for example a trained machine learning process or a rules-based algorithm that that weights and compares potential sensitivity elements to electronic dataset identifiers such as semantic tags and metadata in defined sensitivity elements. Further aspects of machine learning implementation of the recited "comparing" are described herein above, for example in connection with FIGS. 3B-7. At 1330, the one or more processors may train the one or more machine learning components using an iterative training algorithm.

Referring to FIG. 14, at 1410, the one or more processors perform the method 800, wherein the sensitivity assessment includes, for each corresponding one of the sensitive portions, a type of the corresponding sensitivity tags, an intensity map, a bar graph representing a quantitative level of sensitivity, or a combination thereof. For example, FIG. 4A illustrates the types (470, such as 470a-470c) of corresponding sensitivity tags, an intensity map (e.g., 415, 425, 435), and a bar graph 490.

At 1420, the one or more processors perform the method 800, wherein the sensitive portions are defined by at least one of imagery or language prohibited by law or flagged for one or more of a localization issue, a commercial contract issue, a content licensing issue, a scene change inconsistency, an unresolved frame composition for one or more platforms, an end reel credits amendment, or a combination thereof. For example, FIG. 4D illustrates imagery flagged for one or more localization issues (470a-470d).

At 1430, the one or more processors perform the method 800, wherein the classified portions of the prior productions are defined by at least one of imagery or language prohibited by law or flagged for one or more of a localization issue, a commercial contract issue, a content licensing issue, a scene change inconsistency, an unresolved frame composition for one or more platforms, an end reel credits amendment, or a combination thereof, and the comparing includes processing the digital data using an artificial intelligence routine trained on prior classified portions of a comparable dataset include the same or similar classifications of content. In addition, the method may include providing at least the classified portions of the prior media production to an artificial intelligence routine as training input. The flagging of classified portions of the prior productions may be done in a similar manner as for the flagging of the localization issues as illustrated in FIG. 4D (470a-470d).

Figure 15:
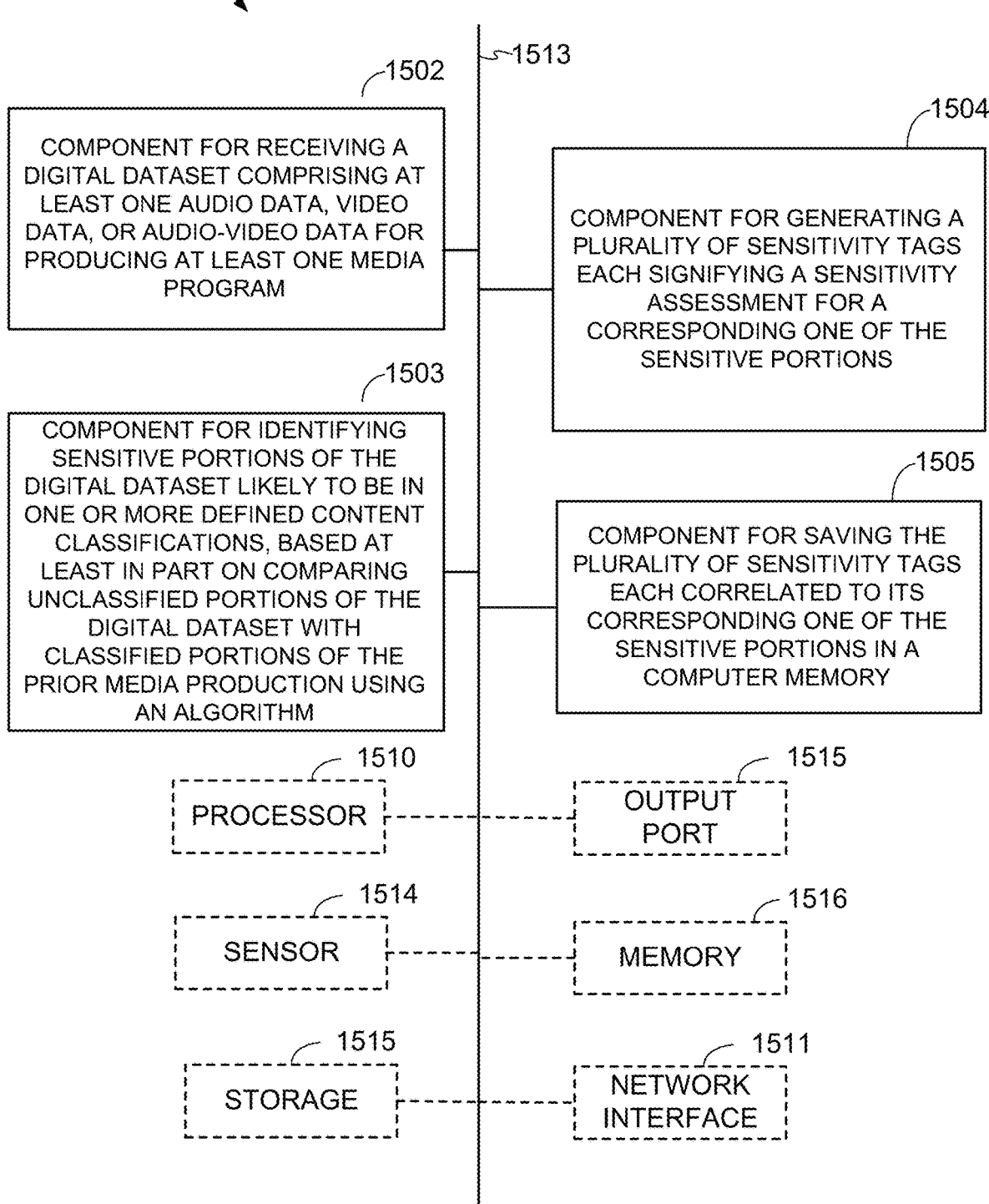
FIG. 15 is a conceptual block diagram illustrating components of an apparatus or system for flagging sensitive portions of a digital dataset for media production.

Referring to FIG. 15, components of an apparatus or system 1500 for flagging sensitive portions of a digital dataset for media production as described herein are illustrated as examples. The apparatus or system 1500 may include additional or more detailed components for performing functions or process operations as described herein. As depicted, the apparatus or system 1500 may include functional blocks that can represent functions implemented by a processor, software, or combination thereof (e.g., firmware).

As illustrated in FIG. 15, the apparatus or system 1500 may include an electrical component 1502 for receiving or otherwise accessing a digital dataset comprising at least one of audio data, video data, or audio-video data for producing at least one media program. The component 1502 may be, or may include, a means for said receiving or accessing. Said means may include the processor 1510 coupled to the memory 1516, a network interface 1511, a sensor (array) 1514, a storage 1515, an output port 1512, and a bus 1513, the processor executing an algorithm based on program instructions stored in the memory. In an aspect, the digital dataset may be received from external systems via the network interface. Such algorithm may include a sequence of more detailed operations, for example, establishing a communication session with a client device associated with at least one user using the device (e.g., computer terminal, smartphone, tablet, etc.) to flag sensitive portions of a digital dataset.

The apparatus 1500 may further include an electrical component 1503 for identifying sensitive portions of the digital dataset likely to be in one or more defined content classifications, based at least in part on comparing unclassified portions of the digital dataset with classified portions of the prior media production using an algorithm. The component 1503 may be, or may include, a means for said identifying. Said means may include the processor 1510 coupled to the memory 1516, a network interface 1511, a sensor (array) 1514, a storage 1515, an output port 1512, and a bus 1513, the processor executing an algorithm based on program instructions stored in the memory. Such algorithm may include a sequence of more detailed operations, for example, as shown in FIGS. 3C, 3E, and 7, including a machine-learning or rules-based algorithm.

The apparatus 1500 may further include an electrical component 1504 for generating a plurality of sensitivity tags each signifying a sensitivity assessment for a corresponding one of the sensitive portions. The component 1505 may be, or may include, a means for said generating. Said means may include the processor 1510 coupled to the memory 1516, a network interface 1511, a sensor (array) 1514, a storage 1515, an output port 1512, and a bus 1513, the processor executing an algorithm based on program instructions stored in the memory. Such algorithm may include a sequence of more detailed operations, for example, as shown and described in connection with FIGS. 4A-5B.

The apparatus 1500 may further include an electrical component 1505 for saving the plurality of sensitivity tags each correlated to its corresponding one of the sensitive portions in a computer memory. The component 1505 may be, or may include, a means for said saving. Said means may include the processor 1510 coupled to the memory 1516, a network interface 1511, a sensor (array) 1514, a storage 1515, an output port 1512, and a bus 1513, the processor executing an algorithm based on program instructions stored in the memory.

In related aspects, the apparatus 1500 may include a network interface module 1511 operable for communicating with system components over a computer network, or communicating with any external storage device, with external systems or servers, or connected vehicles over a computer network. A network interface 1511 module may be, or may include, for example, an Ethernet port or serial port (e.g., a Universal Serial Bus (USB) port), a Wi-Fi interface, or a cellular telephone interface. In further related aspects, the apparatus 1500 may include a module for storing information, such as, for example, a storage 1515, or a memory device 1516, that stores or saves the set of sensitivity assessment measures. The computer readable medium 1515 or the memory module 1516 may be operatively coupled to the other components of the apparatus 1500 via the bus 1513, via the network interface 1511, or the like. The storage 1515 or the memory module 1516 may be adapted to store computer readable instructions and data for effecting the processes and behavior of the modules 1502-1505, and subcomponents thereof, or the processor 1510, the method 800 and one or more of the additional operations 900-1430 disclosed herein, or any method for performance by sensitivity assessment engine or server described herein. The memory module 1516 may retain instructions for executing functions associated with the modules 1502-1505 and any one or more of the operations described herein, for example in connection with one or more of FIGS. 3B-7. While shown as being external to the memory 1516, it is to be understood that the modules 1502-1505 can exist within the memory 1516 or an on-chip memory of the processor 1510.

The apparatus 1500 may include a transceiver 1512 configured as a wireless transmitter/receiver, or a wired transmitter/receiver, for transmitting and receiving a communication signal to/from another system component such as, for example, an RFID tag or location information transmitter. In alternative embodiments, the processor 1510 may include networked microprocessors from devices operating over a computer network. The apparatus 1500 may include, or may be connected to, one or more position or biometric sensors 1514, which may be of any suitable types. Various examples of suitable sensors are described herein above.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component or a module may be, but are not limited to being, a process running on a processor, a processor, an object, an executable, a thread of execution, a program, and/or a computer. By way of illustration, both an application running on a server and the server can be a component or a module. One or more components or modules may reside within a process and/or thread of execution and a component or module may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies, heads-up user interfaces, wearable interfaces, and/or mouse-and-keyboard type interfaces. Examples of such devices include VR output devices (e.g., VR headsets), AR output devices (e.g., AR headsets), computers (desktop and mobile), televisions, digital projectors, smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device (PLD) or complex PLD (CPLD), discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, digital versatile disk (DVD), Blu-ray™, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a client device or server. In the alternative, the processor and the storage medium may reside as discrete components in a client device or server.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips, or other format), optical disks (e.g., compact disk (CD), DVD, Blu-ray™ or other format), smart cards, and flash memory devices (e.g., card, stick, or other formats). Of course, those skilled in the art will recognize many modifications may be made to this configuration without departing from the scope of the disclosed aspects.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein. What is claimed is:

The invention claimed is:

1. A computer-implemented method for flagging sensitive portions of a digital dataset for media production, the method comprising:
   receiving, by one or more processors, the digital dataset comprising at least one of audio data, video data, or audio-video data for producing at least one media program;
   identifying, by the one or more processors, sensitive portions of the digital dataset likely to be in one or more defined content classifications, based at least in part on comparing unclassified portions of the digital dataset with classified portions of the prior media production using an algorithm;
   generating, by the one or more processors, a plurality of sensitivity tags each signifying a sensitivity assessment for a corresponding one of the sensitive portions;
   relating, by the one or more processors, the plurality of sensitivity tags to one of a plurality of distribution profiles, wherein generating the plurality of sensitivity tags is based in part on the one of the plurality of distribution profiles, wherein each of the distribution profiles identifies a set of sensitive topics each correlated to one or more content control rules;
   assigning, by the one or more processors, a sensitivity score to each of the sensitivity tags based on the one of the plurality of distribution profiles; and
   saving the plurality of sensitivity tags each correlated to its corresponding one of the sensitive portions in a computer memory.

2. The method of claim 1, wherein generating the plurality of sensitivity tags comprises assessing a sensitivity that each corresponding one of the sensitive portions does not comply with the one or more content control rules correlated thereto.

3. The method of claim 1, further comprising performing the generating and the saving for distinct pluralities of the sensitivity tags each signifying a corresponding sensitivity assessment based on a different one of the plurality of distribution profiles.

4. The method of claim 3, further comprising saving the distinct pluralities of the sensitivity tags as a multidimensional tensor.

5. The method of claim 1, further comprising generating, by the one or more processors, a display of the digital dataset with indications of the plurality of sensitivity tags.

6. The method of claim 5, further comprising providing, by the one or more processors, additional content coordinated with the plurality of sensitivity tags.

7. The method of claim 1, further comprising displaying, by the one or more processors, the plurality of sensitivity tags for one or more frames of the video or audio-video data.

8. The method of claim 1, wherein the identifying further comprises using one or more machine learning components trained to recognize similarity between the one or more sensitive portions and the classified portions of the prior media production.

9. The method of claim 8, wherein the identifying further comprises predicting a level of sensitivity of the one or more sensitive events using the one or more machine learning components.

10. The method of claim 1, wherein the sensitivity assessment includes, for each corresponding one of the sensitive portions, a type of the corresponding sensitivity tags, an intensity map, a bar graph representing a level of sensitivity, or a combination thereof.

11. The method of claim 1, wherein the sensitive portions are defined by at least one of imagery or language prohibited by law or flagged for one or more of a localization issue, a commercial contract issue, a content licensing issue, a scene change inconsistency, an unresolved frame composition for one or more platforms, an end reel credits amendment, or a combination thereof.

12. The method of claim 1, wherein the sensitivity assessment includes metadata for targeting localization or distribution of the electronic dataset.

13. The method of claim 12, wherein the classified portions of the prior art are defined by at least one of imagery or language prohibited by law or flagged for one or more of a localization issue, a commercial contract issue, a content licensing issue, a scene change inconsistency, an unresolved frame composition for one or more platforms, an end reel credits amendment, or a combination thereof, and the comparing comprises providing at least the classified portions of the prior media production to an artificial intelligence routine as training input.

14. An apparatus for automatically flagging sensitive portions of a digital dataset for media production, the apparatus comprising at least one processor coupled to a memory, the memory holding program instructions that when executed by the at least one processor cause the apparatus to perform:
   receiving the digital dataset comprising at least one of audio data, video data, or audio-video data for producing at least one media program;
   identifying sensitive portions of the digital dataset likely to be in one or more defined content classifications, based at least in part on comparing unclassified portions of the digital dataset with classified portions of the prior media production using an algorithm;

generating a plurality of sensitivity tags each signifying a sensitivity assessment for a corresponding one of the sensitive portions;

relating the plurality of sensitivity tags to one of a plurality of distribution profiles, wherein generating the plurality of sensitivity tags is based in part on the one of the plurality of distribution profiles, wherein each of the distribution profiles identifies a set of sensitive topics each correlated to one or more content control rules;

assigning a sensitivity score to each of the sensitivity tags based on the one of the plurality of distribution profiles: and saving the plurality of sensitivity tags each correlated to its corresponding one of the sensitive portions in a computer memory.

15. The apparatus of claim 14, wherein the memory holds further instructions for generating the plurality of sensitivity tags at least in part by assessing a sensitivity that each corresponding one of the sensitive portions does not comply with the one or more content control rules correlated thereto.

16. The apparatus of claim 14, wherein the memory holds further instructions for performing the generating and the saving for distinct pluralities of the sensitivity tags each signifying a corresponding sensitivity assessment based on a different one of the plurality of distribution profiles.

17. The apparatus of claim 16, wherein the memory holds further instructions for saving the distinct pluralities of the sensitivity tags as a multidimensional tensor.

* * * * *